United States Patent [19]

Nohmi et al.

[11] Patent Number: 4,813,983

[45] Date of Patent: Mar. 21, 1989

[54] COMPOSITE MEMBRANE FOR USE IN GAS SEPARATION

[75] Inventors: Takashi Nohmi, Tokyo; Toshibumi Fukai, Shizuoka, both of Japan

[73] Assignee: Asahi Kasei Kogyo Kabushiki Kaisha, Osaka, Japan

[21] Appl. No.: 170,691

[22] Filed: Mar. 14, 1988

Related U.S. Application Data

[63] Continuation of Ser. No. 34,949, Apr. 6, 1987, abandoned, which is a continuation-in-part of Ser. No. 839,279, Mar. 13, 1986, abandoned.

[30] Foreign Application Priority Data

Mar. 13, 1985 [JP] Japan ................................ 60-48240

[51] Int. Cl.$^4$ .............................................. B01D 53/22
[52] U.S. Cl. .......................................... 55/158; 55/16; 55/68; 428/378; 428/394
[58] Field of Search ............................ 55/16, 68, 158; 210/490, 500.23, 500.34, 500.41; 428/378, 394

[56] References Cited

U.S. PATENT DOCUMENTS

| | | | |
|---|---|---|---|
| 3,822,202 | 7/1974 | Hoehn ................................ | 55/158 X |
| 3,899,309 | 8/1975 | Hoehn et al. ...................... | 55/158 X |
| 4,214,020 | 7/1980 | Ward et al. ....................... | 210/490 X |
| 4,230,463 | 10/1980 | Henis et al. ........................ | 55/68 X |
| 4,279,855 | 7/1981 | Ward, III .......................... | 264/298 |
| 4,364,759 | 12/1982 | Brooks et al. ..................... | 55/158 X |
| 4,374,891 | 2/1983 | Ward, III .......................... | 428/220 |
| 4,406,673 | 9/1983 | Yamada et al. .................... | 55/158 X |
| 4,481,260 | 11/1984 | Nohmi ........................ | 210/500.23 X |
| 4,565,846 | 1/1986 | Saito et al. ........................ | 55/158 X |

FOREIGN PATENT DOCUMENTS

| | | | |
|---|---|---|---|
| 82355 | 6/1983 | European Pat. Off. ........ | 210/500.34 |
| 99971 | 8/1975 | Japan . | |
| 89564 | 8/1976 | Japan . | |
| 18482 | 2/1978 | Japan ............................ | 210/500.34 |
| 8506 | 1/1983 | Japan ........................ | 55/158 |
| 92406 | 6/1983 | Japan ............................ | 210/500.34 |
| 92450 | 6/1983 | Japan ........................ | 55/158 |
| 86612 | 5/1984 | Japan ........................ | 55/158 |
| 216603 | 12/1984 | Japan ........................ | 55/158 |

Primary Examiner—Robert Spitzer
Attorney, Agent, or Firm—Birch, Stewart, Kolasch & Birch

[57] ABSTRACT

There is disclosed a composite membrane comprising [A] a polysulfone type porous membrane capable of rejecting 90% or more of dextran molecules having a weight average molecular weight of 70,000 and [B] a specific styrene type resin coated on at least one side of the polysulfone type porous membrane in a thickness of 5 μm or less and in an amount of $1 \times 10^{-7}$ g/cm$^2$ of the polysulfone type porous membrane, the styrene type resin being selected from the group consisting of (I) a specific styrene type linear polymer having a weight average molecular weight of $1 \times 10^{-5}$ or more, (II) a specific blend polymer prepared by blending at least two different styrene type linear polymers each as defined above and (III) a specific crosslinked polymer selected from the group consisting of (i) a crosslinked polymer prepared by crosslinking a styrene type linear polymer having a weight average molecular weight of $1 \times 10^{-3}$ or more and (ii) a crosslinked polymer prepared by blending at least two different styrene type linear polymers each having a weight average molecular weight of $1 \times 10^3$. Such a composite membrane has been found to be advantageously employed for gas separation because of its high gas permeability and high selective gas permeability.

5 Claims, 6 Drawing Sheets

COMPOSITE MEMBRANE FOR USE IN GAS SEPARATION

This application is a continuation of application Ser. No. 34,949 filed on Apr. 6, 1987, which was a continuation-in-part of Ser. No. 839,279, filed on Mar. 13, 1986, both now abandoned.

This invention relates to a composite membrane. More particularly, the present invention is concerned with a composite membrane for use in the separation of a gas from a gaseous mixture.

Separation of a gas from a gaseous mixture is becoming more important in various fields. The separation of a component gas from a gaseous mixture is conducted for various purposes, such as recovery of a desired gas, enrichment of a certain component gas in a gaseous mixture, adjustment of a molar ratio of component gases in a gaseous mixture, etc. With respect to the recovery of a desired gas, there have conventionally been employed a so-called cryogenic processing method. Such a method, however, is unsatisfactory. For example, as the recovery of a desired gas, there can be mentioned recovery of hydrogen from a discharged gaseous mixture obtained in a hydrogenation plant of a petroleum refining factory. Although hydrogen is an important gas in the industries, the discharged gaseous mixture is low in hydrogen concentration, low in pressure and small in quantity and, therefore, the cryogenic processing method cannot be applied effectively. So, it is usual to use the discharged gaseous mixture as a fuel or to burn it out. Also, for the recovery of methane gas from a gaseous mixture produced by the decomposition of a refuse buried under ground, recovery of hydrogen contained in a purge gas discharged from an ammonia converter, recovery of hydrogen contained in a purge gas discharged from a methanol synthesizing plant etc., the conventional cryogenic method is not effective. Therefore, a demand for developing an effective means has been increasing for recovering a desired gas from a gaseous mixture. Meanwhile, with respect to the enrichment of a certain gas in a gaseous mixture and adjustment of a molar ratio of component gases in a gaseous mixture, there can be mentioned, for example, adjustment of a hydrogen/carbon monoxide molar ratio in a coal gas, adjustment of an ammonia/ hydrogen/nitrogen molar ratio in a gaseous mixture to be used for the synthesis of ammonia, adjustment of a hydrogen/carbon monoxide molar ratio in a gaseous mixture to be used for an oxo synthesis, preparation of oxygen- or hydrogen-enriched air from atmospheric air, enrichment of hydrogen in a hydrogen-containing gas which is generated in forming gasoline, etc. For these purposes also, the conventional cryogenic method is unsatisfactory.

Recently, various membranes made of high polymeric substances have been proposed for use in gas separation. Known membranes for gas separation are generally divided into three groups: a membrane having a uniform structure, a composite membrane comprising a porous membrane as supporting material and formed thereon a semi-permeable ultrathin film, and an occlusion type composite membrane comprising a porous membrane as supporting material and formed thereon a coating for filling up the pores present on the surface of the porous membrane.

As to the membrane having a uniform structure for gas separation, known is a film or hollow fiber made of an aromatic polyimide, polyester, polyamide, polyamide-imide, poly(4-methyl-1-pentene), polydimethylsiloxane, or the like (see Japanese Patent Application Laid-Open Specification No. 50-99971/1975corresponding to U.S. Pat. Nos. 3,822,202 and 3,899,309). This type of membrane is low in production cost but extremely poor in gas permeability or selective gas separation, and hence, cannot be advantageously used for practical purposes.

On the other hand, as to the composite membrane comprising a porous membrane as supporting material and coated thereon a semi-permeable ultrathin film, a silicone film is generally used as the semi-permeable film (see Japanese Patent Application Laid-Open Specification No. 51-89564/1976 corresponding to U.S. Pat. Nos. 4,279,855 and 4,374,891). In this connection, it is noted that the thickness of the semi-permeable film should be as small as 1 $\mu$m or less, preferably 0.1 $\mu$m or less to attain the desired gas permeability. In addition, it is to be noted that such a thin semipermeable film should be provided in a pinhole-free form. However, difficulties are encountered in forming on the porous membrane an ultrathin film having no pinholes. Due to the ultrathin thickness of the film to be formed, the accidental inclusion in a coating solution of foreign matters such as dust in air and a slight vibration of the porous membrane on which the ultrathin film is to be formed have a great adverse influence so that on the formation of the film on the porous membrane pinholes are unfavorably formed in the resulting film. Therefore, in forming the ultrathin film, an air-cleaning system in which a clean bench or the like is used and antivibration equipment should be used to avoid the formation of pinholes in the film. This leads to high production cost of the composite membrane. But even in the use of air-cleaning systems and antivibration equipment, pinholes are often formed in the film, causing the selective gas permeability to be lowered. In view of the above, the above-mentioned type of composite membrane cannot be advantageously put to practical use.

As to the occlusion type composite membrane comprising a porous membrane as supporting material and formed thereon a coating for filling up the pores on the surface of the porous membrane, reference may be made to U.S. Pat. No. 4,230,463. The occlusion type composite membrane disclosed in U.S. Pat. No. 4,230,463 comprises a porous membrane made of a material having a high selective gas permeability and formed thereon a coating of a material having a low selective gas permeability for filling up the large pores present on the surface of the porous membrane. A representative example of the material for the porous membrane is a polysulfone whose selective gas permeability for oxygen over nitrogen is, for example 6.0 in terms of the separation factor as defined in the U.S. Pat. No. 4,230,463. On the other hand, representative examples of the coating material are poly(phenylmethyl siloxane) and an organic liquid such as oligomeric styrene having a degree of polymerization of about 3, the selective gas permeabilities for oxygen over nitrogen of which are less than 2.5 in terms of the separation factor. Because of the low selective gas permeability of the coating material, the selective gas permeability of this type of composite membrane is not high enough for practical purposes. Further, in the composite membrane, the coating material is deeply penetrated into the porous membrane through the large pores and, further, the excessive coating material covers the surface of the porous membrane.

Therefore, the occlusion type composite membrane is poor in gas permeability as well.

The term "gas permeability" is used herein to show the capacity of a membrane for passing a given gas therethrough. The term "selective gas permeability" or "selective permeability" is used herein to show the selectivity of a membrane in gas permeation for a given gas relative to the other gas.

As is apparent from the foregoing, the conventional membranes proposed for gas separation are unsatisfactory in both gas permeability and selective gas permeability.

In view of the current situation as described above, the present inventors have made extensive and intensive studies to develop a membrane for gas separation which is excellent in selective gas permeability as well as in gas permeability. As a result, it has surprisingly been found that a composite membrane comprising a coating of a specific polystyrene type resin formed on the surface of a porous membrane of a specific polysulfone type resin is excellent in both gas permeability and selective gas permeability. Generally, a coating material having a high selective gas permeability exhibits a low gas permeability. To obtain a composite membrane exhibiting a high gas permeability by the use of a coating material having a high selective gas permeability, it is generally necessary to employ a coating material having an extremely small thickness. However, by this method employing a coating material having an extremely small thickness, it has been difficult to manufacture a composite membrane excellent in both selective gas permeability and gas permeability, especially in the form of a hollow fiber. Hence, conventionally, a coating material such as silicone resin which exhibits a relatively small selective gas permeability but a high gas permeability has often been employed. Accordingly, a composite membrane which is excellent in both selective gas permeability and gas permeability has not yet been obtained in the art.

By contrast, with respect to the present composite membrane, both of the polysulfone type resin used as a porous membrane material and the specific polystyrene type resin used as a coating material exhibit high selectivity in gas permeation. The present inventors have surprisingly found that the present composite membrane comprising such a substrate resin and a coating material, both of which have high selectivities in gas permeation also exhibits a high gas permeability. It is quite unexpected that a highly useful composite membrane which is excellent in both selective gas permeability and gas permeability can be obtained by the combination of a porous polysulfone membrane having a specific pore size distribution with a polystyrene type coating material comprising specific structural units and having a specific molecular weight. The present invention has been made based on such a novel and unexpected finding.

Accordingly, it is an object of the present invention to provide a composite membrane for gas separation which is excellent in selective gas permeability as well as in gas permeability.

The foregoing and other objects, features and advantages of the present invention will be apparent to those skilled in the art from the following detailed description taken in conjunction with the accompanying drawings in which.

Figure 9:
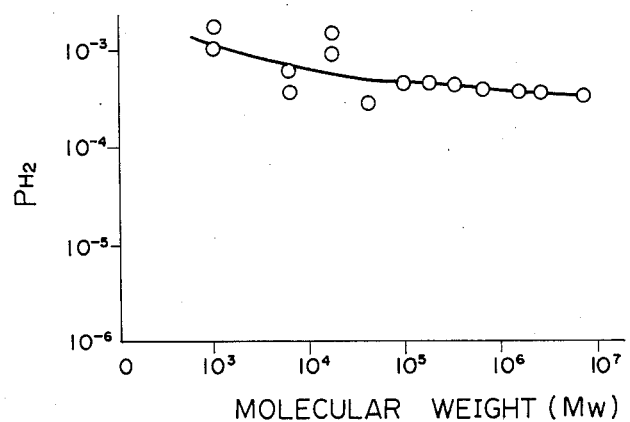
Figure 10:
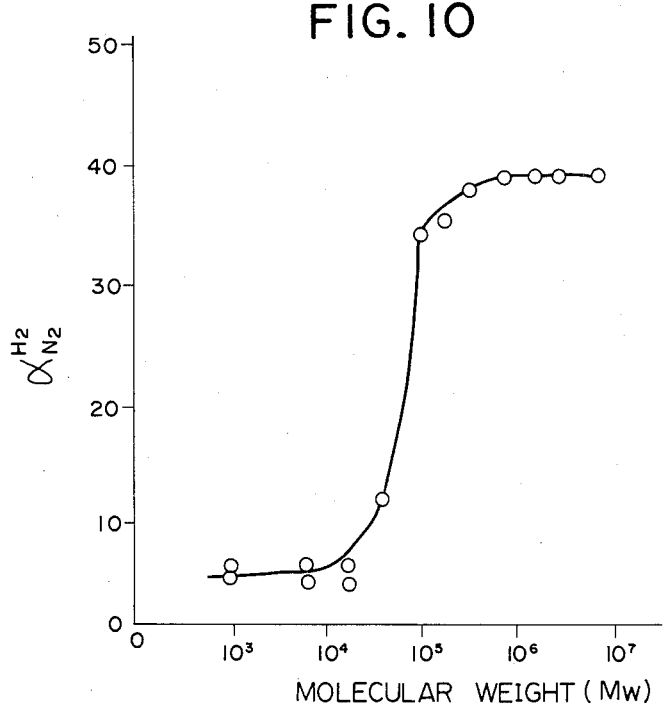

FIG. 9 is a graph showing the relationship between the weight average molecular weight of polystyrene used as the coating of the composite membranes obtained in Example 49 as will be given later and the permeability for $H_2$ ($Q_{H2}$) of the composite membranes; and FIG. 10 is a graph showing the relationship between the weight average molecular weight of polystyrene used as the coating of the composite membranes obtained in Example 49 as will be given later and the selective permeability constant of $H_2$ over $N_2$ ($\alpha Hs/N2$) of the composite membranes.

According to the present invention, there is provided a composite membrane for use in the separation of a gas from a gaseous mixture which comprises:

[A] a polysulfone type resin porous membrane capable of rejecting 90% or more of dextran molecules having a weight average molecular weight of 70,000; and

[B] a styrene type resin coated on at least one surface of said polysulfone type resin porous membrane, said styrene type resin being a member selected from the group consisting of:

(I) a linear polymer having a weight average molecular weight of $1 \times 10^5$ or more comprising 0 to 100 mol % of a structural unit (a), 0 to 100 mol % of a structural unit (b) and 0 to 30 mol % of a structural unit (c), provided that the total amount of said structural units (a), (b) and (c) is 100 mol %, said structural unit (a) being represented by the formula

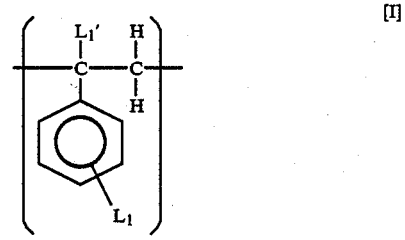

wherein $L_1$ is selected from the group consisting of a hydrogen atom, a halogen atom and a straight or branched hydrocarbon radical having 1 to 10 carbon atoms, and $L_1'$ is selected from the group consisting of a hydrogen atom, a halogen atom and a straight or branched hydrocarbon radical having 1 to 6 carbon atoms, said structural unit (b) being represented by the formula

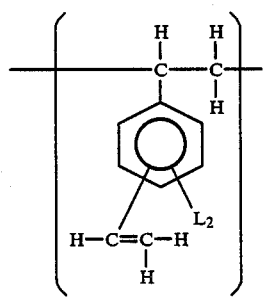
[II]

wherein $L_2$ is selected from the group consisting of a hydrogen atom, a halogen atom and a straight or branched hydrocarbon radical having 1 to 8 carbon atoms, said structural unit (c) being represented by the formula

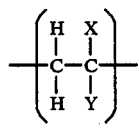
[III]

wherein X is selected from the group consisting of a hydrogen atom, a halogen atom, a methyl group and a cyano group, and Y is selected fom the group consisting of (i)

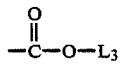

wherein $L_3$ is selected from the group consisting of a straight or branched hydrocarbon radical having 1 to 20 carbon atoms, (ii) a cyano group, (iii) a nitro group, (iv) a pyridyl group, (v)

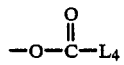

wherein L4 is selected from the group consisting of a straight or branched hydrocarbon radical having 1 to 12 carbon atoms, and (vi)

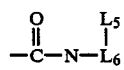

wherein $L_5$ and $L_6$ each independently are selected from the group consisting of a hydrogen atom, a straight or branched hydrocarbon radical having 1 to 12 carbon atoms, a phenyl group and a cyclohexyl group, (II) a blend polymer prepared by blending at least two different linear polymers (I) each as defined above, and (III) a crosslinked polymer selected from the group consisting of:

(i) a crosslinked polymer prepared by crosslinking a linear polymer having a weight average molecular weight of $1 \times 10^3$ or more comprising 0 to 100 mol % of a structural unit (a) as defined above, 0 to 100 mol % of a structural unit (b) as defined above and 0 to 30 mol % of a structural unit (c) as defined above, provided that the total amount of said structural units (a), (b) and (c) is 100 mol %, and (ii) a crosslinked polymer prepared by crosslinking a blend polymer prepared by blending at least two different linear polymers each having a weight average molecular weight of $1 \times 10^3$ or more, said linear polymer each comprising 0 to 100 mol % of a structural unit (a) as defined above, 0 to 100 mol % of a structural unit (b) as defined above and 0 to 30 mol % of a structural unit (c) as defined above, provided that the total amount of said structural units (a), (b) and (c) is 100 mol %, said styrene type resin being coated on said polysulfone type resin porous membrane in a thickness of 5 μm or less and in an amount of at least $1.0 \times 10^{-7}$ g/cm² of said polysulfone type resin porous membrane.

The composite membrane of the present invention is used for the separation of a gas from a gaseous mixture. As examples of the gas separation for which the composite membrane of the present invention may be advantageously used, there may be mentioned the separation between oxygen and nitrogen in air; the separation of hydrogen, helium or steam from a gaseous mixture of one of them and at least one of carbon monoxide, carbon dioxide, nitrogen, oxygen, argon, hydrogen sulfide, nitrous oxide, ammonia, and hydrocarbons such as methane, ethane, propane, butane, ethylene, propylene, butadiene and acetylene; the separation of ammonia from a gaseous mixture of ammonia and at least one of hydrogen, nitrogen, argon and hydrocarbons having 1 to 5 carbon atoms; and the separation between hydrogen sulfide and hydrocarbons having 1 to 5 carbon atoms.

The composite membrane of the present invention comprises a polysulfone type resin porous membrane and a styrene type resin coated on at least one surface of the polysulfone type porous membrane. The polysulfone type resin porous membrane to be used in the present invention is one capable of rejecting 90 % or more of dextran molecules having a weight average molecular weight of 70,000. When the percentage rejection of dextran molecules having a weight average molecular weight of 70,000 with respect to the polysulfone type resin porous membrane is less than 90 %, the gas permeability of the resulting composite membrane is increased but the selective permeability for the desired gas is unfavorably lowered. The membrane capable of rejecting 90 % or more of dextran having a weight average molecular weight of 70,000 has pores on the surface thereof having an average diameter of 50 Å or less.

The polysulfone type resin porous membrane to be used in the present invention may be one made of an aliphatic or aromatic polysulfone comprising a structural unit represented by the formula

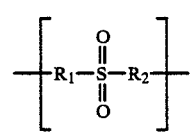
[IV]

wherein R₁ and R₂ each independently stand for a bivalent radical having free valences at its both ends derived from a compound containing an aliphatic or aromatic hydrocarbon having 1 to 40 carbon atoms. As examples of preferable polysulfone type resin, there may be mentioned aromatic polysulfones respectively comprised of structural units represented by the formulae [V], [VI] and [VII],

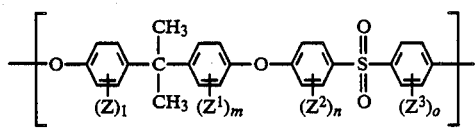
[V]

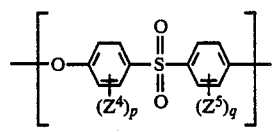
[VI]

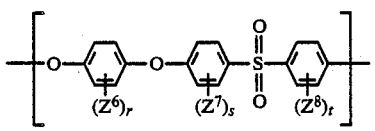
[VII]

wherein Z, $Z^1$, $Z^2$, $Z^3$, $Z^4$, $Z^5$, $Z^6$, $Z^7$ and $Z^8$ each independently stand for a non-dissociative substituent such as a lower alkyl group selected from the group consisting of methyl, ethyl, n-propyl and n-butyl or a halogen atom selected from the group consisting of F, Cl, Br and I, or a dissociative substituent such as —COOH, —SO₃H, —NH₃, —NH₄⁺ or the like, and l, m, n, o, p, q, r, s and t each independently stand for an integer of from 0 to 4. These aromatic polysulfone type resins each preferably have a number average molecular weight of 5,000 to 100,000 as determined according to the osmotic pressure method. These aromatic polysulfone type resins are capable of providing membranes which are excellent in heat resistance, acid resistance, alkali resistance, chemicals resistance and mechanical strength. When the polysulfone type resin has a number average molecular weight of less than 5,000, the mechanical strength of the membrane made of the polysulfone type resin is poor and the membrane is liable to tear.

In the present invention, the polysulfone type resin porous membrane may be of any form. For example, the membrane may be a hollow fiber membrane, a flat type membrane, a flat type membrane supported on a support, or a tubular membrane. When the polysulfone type resin porous membrane to be used in the present invention is a hollow fiber, the hollow fiber is generally composed of one surface skin layer present on at least one surface thereof and supporting layers (such as a void layer, an intermediate layer and the like) supporting the skin layer. With respect to the hollow fiber membranes which may be used in the present invention, reference may be made to, for example, U.S. patent specification No. 4,481,260.

The skin layer is a dense layer of a polymer material, and no pores having a pore diameter of 200 Å or more are observed when the skin layer is examined by a photomicrograph of a scanning type electron microscope. The thickness of the skin layer is 10 μm or less. The supporting layer may have a homogeneous cell structure or void structure. In the case of a void structure, the gas permeability is improved. On the other hand, in the case of a homogeneous cell structure, the resistance to pressure is excellent. From the viewpoints of high pressure resistance, large membrane area per unit volume and ease in rendering the membrane thickness small, the membrane is preferably a hollow fiber.

Next, referring to a hollow fiber membrane as an example, an explanation with respect to the process for producing the membrane will be given below. The polysulfone type resin hollow fiber membrane may be prepared by customary methods, e.g. by extruding a spinning solution made by dissolving a polysulfone type resin in a solvent for the resin from an annular hollow filament spinning orifice simultaneously with the extrusion of an internal coagulating liquid, and introducing the extrudate into an external coagulating liquid (see, e.g. U.S. Pat. No. 4,481,260).

As the solvent for the polysulfone type resin, there may be mentioned any solvent which is capable of dissolving the polysulfone type resin. Preferred examples of the solvent are polar organic solvents which are miscible with water in any proportion, such as hexamethylphosphoric triamide, dimethylformamide, dimethylacetamide, diethylformamide, diethylacetamide, dipropylformamide, dipropylacetamide, dibutylformamide, dibutylacetamide, N-methyl-2-pyrrolidone, dimethyl sulfoxide, acetylpiperidine, formylpiperidine, formylmorpholine, acetylmorpholine, tetramethyl urea, 1,3-dimethyl-2-imidazolidinone, 1-cyclohexyl-2-pyrrolidone, 2,4-dimethylsulfolane, tetramethylenesulfoxide, and boric acid esters such as EMULBON BDB(trade name of methoxyethyleneoxyethyl butylene-1-3-borate manufactured and sold by Toho Chemical Industries Co., Ltd, Japan), and the like.

In the present invention, a poor solvent may be added to the spinning solution (sulfone type resin solution) in a small amount. The term "poor solvent" is intended to mean a solvent which has little capability of dissolving the polysulfone type resin. By the addition of the poor solvent, it can be expected that the gas permeability of the resulting hollow fiber membrane is improved. The amount of the poor solvent which may be added is varied depending on the kind of the poor solvent, but the poor solvent is generally employed in an amount of 45% by weight or less, preferably 25% by weight or less, more preferably 1 to 20% by weight based on the amount of the spinning solution. When the amount of the poor solvent exceeds 45% by weight based on the amount of the spinning solution, the spinning solution tends to become unstable, making the spinning solution cloudy or opaque. As examples of the poor solvent which can be employed in the present invention, there may be mentioned glycols such as ethylene glycol, diethylene glycol, triethylene glycol, tetraethylene glycol, polyethylene glycol (having a number average molecular weight of 200 to 20,000), propylene glycol, diproplylene glycol, tripropylene glycol and polypropyrene glycol (having a number average molecular weight of 200 to 6,000); ethylene glycol methyl ether derivatives such as ethylene glycol monomethyl ether, ethylene glycol dimethyl ether, diethylene glycol monomethyl ether, diethylene glycol dimethyl ether, triethylene glycol monomethyl ether and triethylene glycol dimethyl ether; propylene glycol methyl ether derivatives; polyhydric alcohols such as glycerin, glycerol, 1,3-propanediol, 1,3-butanediol, 1,4-butanediol, 2,3-butanediol, 1,2,4-butanetriol, 1,2,3,4-butanetetraol, xylite and pentaerythritol; formamide; acetamide; water; alcohols such as methanol, ethanol, propanol and butanol; triethylamine; isopropylamine; nitromethane; 2-pyrrolidone; formic acid and esters thereof; acetic acid and esters thereof; acetone; methyl ethyl ketone; polyoxyethylene alkyl esters; polyoxyethylene alkyl phenol esters; sorbitan fatty acid esters; polyoxyethylene sorbitan fatty acid esters; polyoxyethylene alkylamide; polyoxyethylene fatty acid esters; glycerin fatty acid esters; block copolymers of polyoxyethylene and propylene; alkylphosphates; polyoxyethylene alkylphosphates; condensation product of naphthalene sulfonic acid and formalin; anionic surface active agents such as fatty acid salts and salts of alkylsulfuric acid esters; and cationic surface active agents such as alkylamine salts.

The concentration of the resin in the spinning solution is in the range of generally 17 to 50% by weight, preferably 20 to 35% by weight based on the weight of the spinning solution. When the concentration of the resin is less than 17% by weight, a surface skin layer which is capable of selectively separating gases cannot be formed, causing the selective gas permeability of the membrane to be markedly decreased. On the other hand, when the concentration of the resin exceeds 50% by weight, the thickness of the surface skin layer becomes so large that the gas permeability of the membrane is considerably decreased.

The viscosity of the spinning solution is desirably in the range of from 1,000 to $1 \times 10^6$ cps at 30° C. When the viscosity is less than 1,000 cps, it is difficult to produce hollow fibers to be used in the present invention. On the other hand, when the viscosity of the spinning solution exceeds $1 \times 10^6$ cps, a remarkably high pressure is required for extruding such a viscous spinning solution from the spinning nozzle. Further, in such case, in the filtration of the solution to remove foreign substances from the solution, a high pressure is needed and it is difficult to obtain clear solutions. Still further, when such a viscous solution is used to prepare a hollow fiber, the gas permeability of the resulting hollow fiber membrane becomes considerably low.

The temperature of the spinning solution is preferably relatively high, but generally, the temperature of the spinning solution is in the range of from 0 to 200 ° C, preferably 20 to 150 ° C. When the temperature of the spinning solution is too low, the viscosity of the solution is increased, so that not only it becomes difficult to remove the impurities from the solution by filtration but also it becomes difficult to produce hollow fibers because a high pressure is required for extruding the solution from the spinning nozzle. In addition, when the temperature of the spinning solution is too low, the selective gas permeability of the resulting membrane is unfavorably decreased. On the other hand, when the temperature of the spinning solution exceeds 200° C., most solvents unfavorably boil. However, when a solvent having a boiling point of more than 200° C. is employed, the temperature of the spinning solution may be more than 200° C.

The spinning solution is subjected to filtration prior to spinning. As the filter which can be used in the present invention, there may be mentioned a porous sintered filter prepared by sintering metal powders, a filter net made of stainless steel, a porous membrane made of a polymer such as Teflon (trade name) or polyethylene, a filter paper made of fibers and the like. With respect to the pore diameter of the filter, the smaller, the better. However, the pore diameter or mesh size of the filter is generally 10 $\mu$m or less, preferably 2 $\mu$m or less. When the pore diameter or mesh size of the filter exceeds 10 $\mu$m, the quantity of dusts, impurities, etc. remaining unremoved in the spinning solution even after filtration is increased and they tend to be incorporated into the surface skin layer of the hollow fiber membrane, which leads to unfavorable formation of pinholes in the skin layer, thereby causing the selective gas permeability of the membrane to be lowered.

As the external coagulating liquid, there may be employed any liquid which does not dissolve the polysulfone type resin. As examples of such a liquid, there may be mentioned water; alcohols such as methanol, ethanol, propanol, butanol and the like; glycols such as ethylene glycol, diethylene glycol and the like; ethers; aliphatic hydrocarbons such as n-hexane, n-heptane, n-pentane and the like; glycerols such as glycerin and the like. Of these, there may preferably be employed water, alcohols and mixtures of at least two kinds thereof. To such a liquid or mixture there may be added a solvent or a salt to control the coagulation rate. For example, hexamethylphosphoric triamide may be added to water in an amount of 50% by weight and used as the coagulating liquid.

As the internal coagulating liquid, the same liquid as the external coagulating liquid may be employed. In addition, liquids prepared by dissolving in the above-mentioned kind of coagulating liquids any one of gases such as nitrogen gas, air, inert gases such as helium, argon, neon, krypton and xenon, and freon type gases may also be used as the internal coagulating liquid.

With respect to the temperature of the coagulating liquid, the lower, the better, provided that the coagulating liquid will not solidify. Generally, the temperature of the coagulating liquid may be 50° C. or less, preferably 30° C. or less. When the temperature exceeds 50° C., the selective gas permeability of the resulting hollow fiber membrane becomes unfavorably poor.

The spinning rate is preferably in the range of from 1 to 50 m/min. When the spinning rate is less than 1 m/min, the time in which the spinning solution is extruded from the spinning nozzle to reach a coagulating liquid through air unfavorably becomes too long, so that it becomes difficult to control the rate of injection of the internal coagulating liquid. On the other hand, when the spinning rate exceeds 50 m/min, elongation of the resulting fiber is unfavorably liable to occur because the fiber is pulled at a high speed.

The distance which the extrudate is allowed to run is defined as a distance between the tip of the spinning nozzle and the surface of the external coagulating liquid, and hereinafter will be referred to as "running-in-air distance". The running-in-air distance is in the range of from 0.1 to 50 cm, preferably 1 to 15 cm. When the running-in-air distance is too long, the resulting hollow fiber unfavorably gets out of shape. On the other hand, when the running-in-air distance is 0 cm, bubbles tend to occur at the tip of the spinning nozzle due to the temperature difference between the nozzle and the coagulating liquid, so that the hollow fibers which are uniform in gas permeability cannot be obtained When the spinning solution is extruded from the spinning nozzle into the air, the moisture in the air is introduced into the resulting extrudate, causing the pore diameter of the skin layer of the resulting hollow fiber to become large. Therefore, in the present invention, it is desirable that the space between the nozzle and the external coagulating liquid be surrounded by a hood which is filled with a gas of a predetermined temperature free from moisture such as nitrogen gas and helium gas, and such gas is flowed through the hood at a constant rate. If the gas is not flowed, it becomes difficult to obtain a hollow fiber having a uniform quality because the solvent in the spinning solution evaporates to increase the concentration of the evaporated solvent in the hood, and the hollow fiber is apt to be affected by any moisture in the hood. However, if the gas is flowed at too high a rate, some kind of gas unfavorably causes the hollow fiber to vibrate. The gas should be filtered using a filter of pore diameter 1 μm or less to remove the dust in the gas completely.

The styrene type resin coated on at least one surface of the polysulfone type resin porous membrane is a member selected from the group consisting of (I) a linear polymer having a weight average molecular weight of $1 \times 10^5$ or more, (II) a blend polymer prepared by blending at least two different linear polymers (I), and (III) a crosslinked polymer. The linear polymer (I) comprises 0 to 100 mol % of a structural unit (a), 0 to 100 mol % of a structural unit (b) and 0 to 30 mol % of a structural unit (c), provided that the total amount of the structural units (a), (b) and (c) is 100 mol %.

The structural unit (a) is represented by the

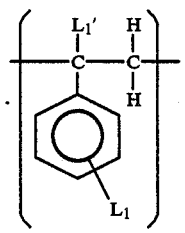
[I]

wherein $L_1$ stands for a hydrogen atom, a halogen atom or a straight or branched hydrocarbon radical having 1 to 10 carbon atoms such as methyl group, ethyl group, propyl group, butyl group, tert-butyl group, pentyl group or hexyl group, and $L_1'$ a hydrogen atom, a halogen atom such as fluorine atom, chlorine atom, bromine atom or iodine atom, or a straight or branched hydrocarbon radical having 1 to 10 carbon atoms, e.g. methyl group.

In the structural unit (a), the substituent $L_1$ is generally at the o- or p-position. As representative examples of structural unit (a), there may be mentioned monomer units of α-methylstyrene, p-methylstyrene, p-tert-butylstyrene and the like.

The structural unit (b) is represented by the formula

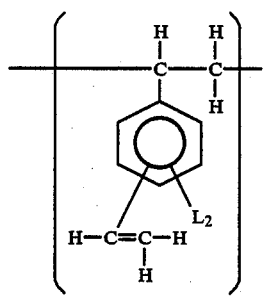
[II]

wherein $L_2$ stands for a hydrogen atom, a halogen atom or a straight or branched hydrocarbon having 1 to 8 carbon atoms such as methyl group, ethyl group, propyl group or isopropyl group, and preferably stands for a hydrogen atom. In the structural unit (b), the vinyl group is preferably at the o- or p-position, more preferably at the p-position of the benzene ring relative to the ethylene group in the main chain. As representative examples of the structural unit (b), there may be mentioned monomer units of divinylbenzene, divinyltoluene, divinylethylbenzene, divinylchlorobenzene, and the like.

The structural unit (c) is represented by the formula

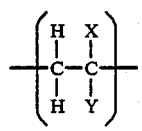
[III]

wherein X stands for a hydrogen atom, a halogen atom, a methyl group or a cyano group, and Y stands for

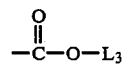

wherein $L_3$ stands for a straight or branched hydrocarbon radical having 1 to 20 carbon atoms, a cyano group, a nitro group or a pyridyl group,

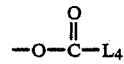

wherein $L_4$ stands for a straight or branched hydrocarbon radical having 1 to 12 carbon atoms, or

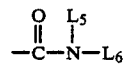

wherein $L_5$ and $L_6$ each independently stand for a hydrogen atom, a straight or branched hydrocarbon radical having 1 to 12 carbon atoms, a phenyl group or a cyclohexyl group.

As representative examples of the structural unit (c), there may be mentioned monomer units of vinyl acetate, vinyl butyrate, vinyl benzoate, vinyl chloride, vinylidene chloride, methyl methacrylate, methyl acrylate, acrylonitrile, methacrylonitrile, acrylamide, methacrylamide, alkyl-substituted acrylamide, vinyl methyl ketone, vinyl propyl ketone, vinyl methyl ether, isopropenyl methyl ketone, vinyl ethyl ether, vinyl hexyl ether, nitroethylene, vinylpyridine, acrylic acid, methacrylic acid, cinnamic acid, crotonic acid, sorbic acid, itaconic acid, propionic acid, maleic acid, fumarates, fumaric anhydride, α-cyanoethyl acrylate, 1,1-dicyanoethylene, and the like.

The linear polymer (I) may be prepared by customary methods. For example, a homopolymer comprising the structural unit (a) and a copolymer comprising the structural units (a) and (c) may be prepared by any of the ion, radical and thermal polymerizations, etc. through bulk, solution, suspension or emulsion polymerization. A homopolymer comprising the structural unit (b), a copolymer comprising the structural units (a) and (b), and a copolymer comprising the structural units (b) and (c), and a copolymer comprising the structural units (a), (b) and (c) may be prepared, for example, by the ion polymerization method as disclosed in Japanese Patent Application Laid-Open Specification No. 56-16509/1981, in tetrahydrofuran using diisopropylamine-alkyllithium as polymerization initiator.

As mentioned above, the linear polymer (I) contains the structural unit (c) in an amount of 0 to 30 mol % based on the total amount of the structural units (a), (b) and (c). When the content of the structural unit (c) in the linear polymer (I) exceeds 30 mol %, the selective gas permeability of the resulting composite membrane tends to be lowered. The content of structural unit (c) in the linear polymer (I) is more preferably 0 to 10 mol %, most preferably 0 to 5 mol % based on the total amount of the structural units (a), (b) and (c).

The weight average molecular weight of the linear polymer (I) is $1\times10^5$ or more, preferably $1\times10^5$ to $1\times10^7$. The weight average molecular weight of the linear polymer (I) may be determined by a high speed liquid chromatography using, for example, tetrahydrofuran as solvent and TSK-GEL GNH6 (the trade name of a column manufactured and sold by Toyo Soda Co., Ltd., Japan) as column. When the weight average molecular weight of the linear polymer is less than $1\times10^5$, the resulting composite membrane is poor in gas permeability and/or selective gas permeability. In this connection, low molecular weight polystyrene, styrene monomer, divinylbenzene and the like unfavorably dissolve or swell the polysulfone type resin porous membrane (supporting material).

The linear polymer (I) may further comprise a small amount of other structural unit than the structural units (a), (b) and (c) each as defined above unless the incorporation of such other structural unit has an adverse effect on the performance of the composite membrane.

The blend polymer (II) is prepared by blending at least two different linear polymers (I) each as defined above. The proportion of each linear polymer in the blend polymer is not critical and, accordingly, at least two different linear polymers (I) each as defined above may be blended in any proportion.

The crosslinked polymer (III) is a member selected from the group consisting of:

(i) a crosslinked polymer prepared by crosslinking a linear polymer having a weight average molecular weight of $1\times10^3$ or more comprising 0 to 100 mol % of a structural unit (a) as defined above, 0 to 100 mol % of a structural unit (b) as defined above and 0 to 30 mol %, preferably 0 to 10 mol %, more preferably 0 to 5 mol % of a structural unit (c) as defined above, provided that the total amount of said structural units (a), (b) and (c) is 100 mol %, and (ii) a crosslinked polymer prepared by crosslinking a blend polymer prepared by blending at least two different linear polymers each having a weight average molecular weight of $1\times10^3$ or more, said linear polymers each comprising 0 to 100 mol % of a structural unit (a) as defined above, 0 to 100 mol % of a structural unit (b) as defined above and 0 to 30 mol %, preferably 0 to 10 mol %, more preferably 0 to 5 mol % of a structural unit (c) as defined above, provided that the total amount of said structural units (a), (b) and (c) is 100 mol %.

The composite membrane having a coating of the above-mentioned crosslinked polymer on the polysulfone type resin porous membrane is excellent in heat resistance and solvent resistance.

When the linear polymer has a weight average molecular weight of less than $1\times10^3$, the crosslinked polymer tends to be brittle or a wax-like solid which forms an unstable coating layer, causing the gas permeability and/or selective gas permeability of the composite membrane to be lowered.

The crosslinking of the above-mentioned linear polymer or blend polymer may be effected as follows. For example, a crosslinking agent may be added to a coating solution containing the polymer prior to the coating of the polymer on the polysulfone type resin porous membrane. In this method, the crosslinking can be accelerated by applying heat to the polymer coated on the polysulfone type resin porous membrane. As examples of the crosslinking agent, there may be mentioned polyfunctional vinyl compounds such as 1,4-divinylbenzene, diallyl isophthalate and diallyl o-phthalate, polyfunctional epoxy compounds, and polyfunctional isocyanate compounds.

Alternatively, the crosslinking may be effected by coating the above-mentioned polymer on the polysulfone type resin porous membrane and, then, exposing the resulting coating to ultraviolet rays, electron rays or heat.

A preferable crosslinking method is varied according to the kind of polymer to be crosslinked. For example, when the polymer to be coated on the polysulfone type resin porous membrane does not comprise the structural unit (b) as defined above, it is preferable that the polymer be coated on the polysulfone type resin porous membrane and, then, exposed to ultraviolet rays to crosslink the polymer. On the other hand, when the polymer to be coated comprises at least the structural unit (b) as defined above, any of the above-mentioned crosslinking methods may be preferably used. Further, in the above-mentioned crosslinking methods, a photolytic free-radical initiator may be added to a coating solution containing the polymer prior to the coating of the polymer on the polysulfone type resin porous membrane. As examples of the photolytic free-radical initiator, there may be mentioned benzophenone; substituted benzophenones such as bis(dimethylamino)benzophenone, bis(diethylamino)benzophenone, chlorobenzophenone and dichlorobenzophenone; benzoin alkyl ethers such as benzoin methyl ether, benzoin isopropyl ether and the like; benzyl dialkyl ketals such as benzyl dimethyl ketal, benzyl diethyl ketal and the like; substituted acetophenones such as α-hydroxyacetophenone, 2,2-diethoxyacetophenone, α-hydroxyisobutyropehone, p-tert-butyltrichloroacetophenone and the like; substituted anthraquinones such as 1-chloroanthraquinone, 2-ethylanthraquinone such as 2-chlorothioxanthone, diisopropylthioxanthone, 2-methylthioxanthone and the like; phenylglyoxalates; anthrone and the like.

The above-mentioned initiator may be used in an amount of from 0.1 to 15% by weight, preferably 1 to 10% by weight based on the amount of the structural unit (b) in the polymer. Sensitizers may also be used in combination with the above-mentioned initiators according to need.

In the composite membrane of the present invention, the coating of a polystyrene type resin formed on a polysulfone type resin porous membrane may be a uniform and dense layer (i.e. non-porous layer) or a porous layer.

The polystyrene type resin coated on the polysulfone type resin porous membrane may be qualitatively analyzed as follows. A composite membrane is dipped in a solvent capable of dissolving a polysulfone type resin, such as chloroform, benzene and toluene, to dissolve the polysulfone type resin porous membrane. When the solvent dissolves not only the polysulfone type resin porous membrane but also the coating thereon and no matter remains undissolved in the solvent, the polymer coated on the polysulfone type porous membrane is regarded as being not crosslinked. In this case, the analysis of the composite membrane is effected as will be mentioned later. On the other hand, in the case where insoluble matter is present in the solvent, the insoluble matter is filtered off using a microporous filter and the polysulfone type resin dissolved in the solvent is completely washed away. The residue is dried and then subjected to pyrolysis gas chromatography. From the spectral analysis of the pyrolitic products, the composition of the crosslinked polymer can be determined. With respect to the pyrolysis gas chromatography, reference may be made to Tsugio Takeuchi et al, "Thermal analysis gas chromatography for polymer", page 79 (1979) published by Kagakudojin, Japan.

Further, whether the polymer coated on the polysulfone type porous membrane is crosslinked can be confirmed as follows. A composite membrane is dipped in a solvent such as cyclohexane and heated at about 60° C. under reflux for about 5 hours. Then, the weight of the treated composite membrane is measured and, then, compared with that before the treatment. When the polymer coated on the polysulfone type porous membrane is highly crosslinked, there is caused no significant change in weight.

When the polymer coated on the polysulfone type resin is not a crosslinked one, the composition of the polymer can be qualitatively and quantitatively determined as follows. First, the qualiative analysis of the polymer coated on the polysulfone type resin porous membrane will be explained below. A composite membrane is treated with a solvent capable of dissolving the polymer coated on the polysulfone type resin hollow fiber (hereinafter often referred to simply as "supporting material") but incapable of dissolving the polysulfone type resin, for example, treated with cycrohexane to dissolve the polymer. After separation from the supporting material, the obtained solution is subjected to elementary analysis, infrared analysis to obtain infrared spectra (IR spectra or FT-IR spectra), proton or $^{13}C$ NMR analysis, pyrolysis gas chromatography and mass spectrometry. Thus, the chemical structure of the polymer coated on the supporting material is determined ["Handbook of polymer analysis" page 265 (1985) edited by Nihon Bunsekikagakukai and published by Asakurashoten, Japan]. With respect to the polymers coated on the supporting material having a relatively small molecular weight, the analysis of the polymers may be carried out directly by high speed liquid chromatography, gas chromatography and mass spectrometry without subjecting to pyrolysis, thereby to determine the chemical structure of the polymer coated on the supporting material.

With respect to the quantitative analysis of the polymer coated on the supporting material, an explanation will be given below. First, a composite membrane is dissolved in a solvent capable of dissolving the composite membrane, such as chloroform, methylene chloride, benzene, xylene, toluene or the like to obtain a homogeneous solution. Then, the solution is diluted with the solvent to have a polymer concentration such that when the solution is dropped on a support plate and then evaporated to form a film on the plate, the weight of the film is in the range of 0.01 to 100 μg.

After the solution has been dropped on the support plate, the support plate is subjected to hot-air drying at 100° C. for 4 hours to evaporate the solvent completely. Then, the resulting film on the plate is put in a pyrolysis tube and heated to a Curie point in a Curie point pyrolyzer. After pyrolysis of the polymer, the resulting pyrolysis gas is subjected to gas chromatography or mass spectrometric analysis.

Figure 5:
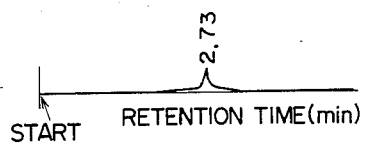
FIGS. 5 and 6 are pyrograms of a polystyrene having a weight average molecular weight of $26 \times 10^4$ which can be used as a styrene type resin to be coated on a polysulfone type resin porous membrane in accordance with the present invention.
Figure 6:
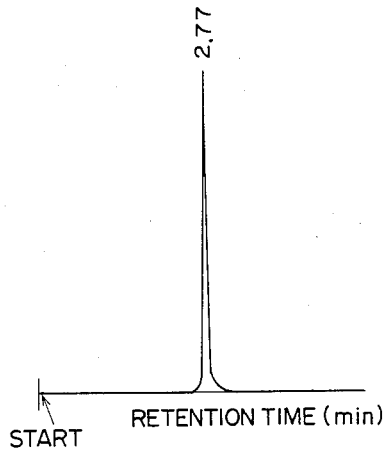

In FIGS. 5 and 6, there are shown pyrograms respectively obtained by the pyrolysis gas chromatography (PGC) of 0.01 μg and 1 μg of a polystyrene having a weight average molecular weight of $26 \times 10^4$ In obtaining FIGS. 5 and 6, the PGC was conducted under the following conditions.

Apparatus: HP5890A (trade name of an apparatus for gas chromatography manufactured by Hewlett Packard Inc., U.S.A.); JHP-3S (trade name of a pyrolizer manufactured by Nihon Bunseki Kogyo K.K., Japan); and Carbowax-20M (trade name of a column having a length of 25 m)
Detector: FID
Injection temperature: 200° C.
Temperature of the pyrolysis furnace: 200° C.
Pyrolysis temperature: 670° C.
Column temperature: 200° C.

Figure 7:
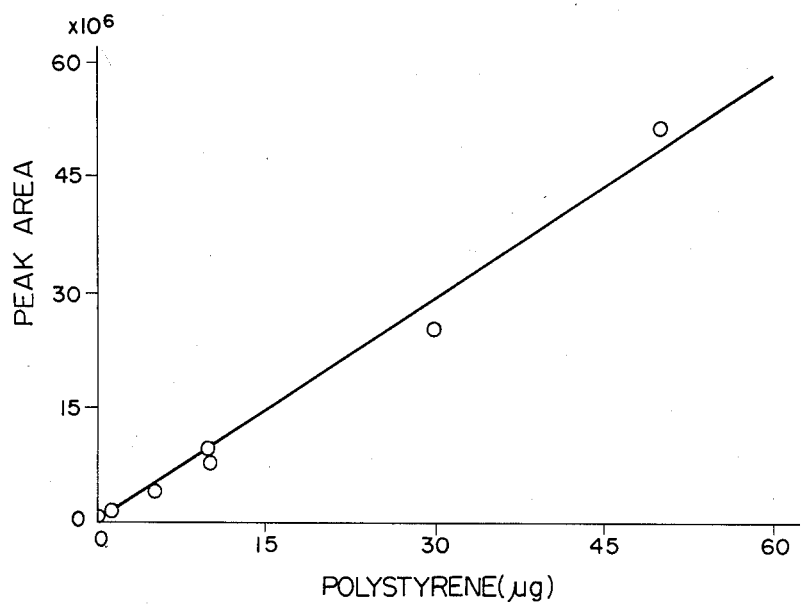
FIGS. 7 and 8 are calibration curves for obtaining the amount of a polystyrene having a weight average molecular weight of $26 \times 10^4$ coated on a polysulfone type resin porous membrane.
Figure 8:
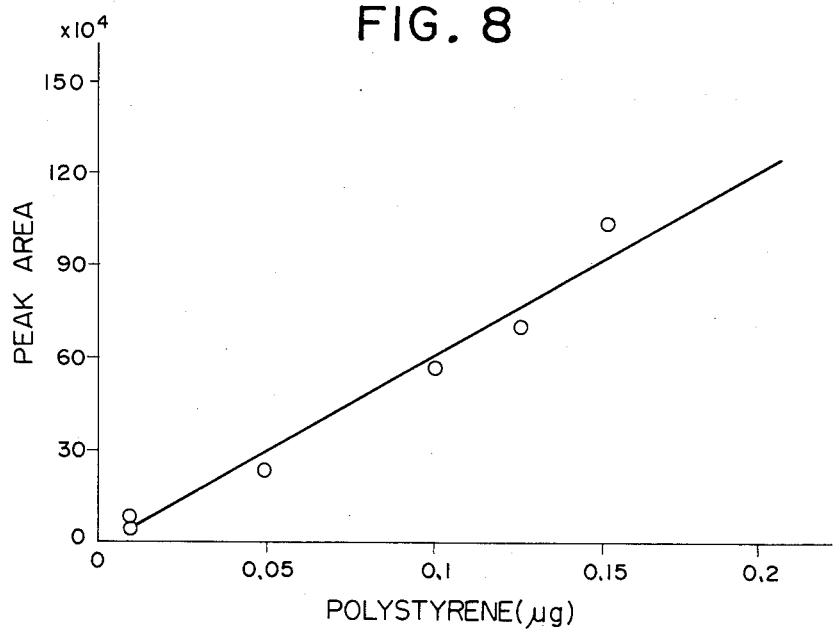

In the analysis by pyrolysis gas chromatography, a calibration curve is used. In FIGS. 7 and 8, there are shown examples of the calibration curves. In this connection, it should be noted that since the data of PGC are affected by the operating conditions of PGC analyzer, a fresh calibration curve should be prepared for every operation of a PGC analyzer.

In the present invention, the thickness of the polystyrene type resin coating formed on the supporting material is 5 μm or less, preferably 4 μm or less. The term "thickness" as used herein is intended to mean an average thickness. When the thickness of the coating is more than 5 μm, the gas permeability of the composite membrane is unfavorably lowered. The thickness of the coating formed on the supporting material may be determined using a scanning electron photomicrograph of the entire cross section of the composite membrane.

In the present invention, the amount of the polystyrene type resin coated on the supporting material is at least $1.0 \times 10^{-7}$ g/cm² of the supporting material. When the amount of the coating is less than $1 \times 10^{-7}$ g/cm² of the supporting material, a highly improved selective gas permeability of the composite membrane cannot be attained. The amount of the polystyrene type resin coated on the supporting material may be determined by the above-mentioned PGC analysis. However, in the case where the amount of the polystyrene type resin coated on the supporting material is less than $1 \times 10^{-6}$ g/cm² of the supporting material or in the case where the polystyrene type resin is coated on a thick supporting material, the peak attributable to the polystyrene type resin and the peak attributable to the polysulfone type resin (used as supporting material) often overlap with each other, leading to inaccurate data with respect to the amount of the polystyrene type resin coated on the supporting material. In this case, the amount of the polystyrene type resin coated on the supporting material may be determined as follows. First, a composite membrane is dipped in a solvent capable of dissolving the coating of a polystyrene type resin but incapable of dissolving the supporting material, such as cyclohexane, and heated at 70° C. under reflux for 5 hours to dissolve the coating. The solvent containing a polystyrene type resin dissolved therein is evaporated to dryness. The obtained residue is dissolved in chloroform and then subjected to high speed liquid chromatography or PGC to determine the amount of the polystyrene type resin coated on the supporting material. The high speed liquid chromatography may be effected using a high speed liquid chromatograph manufactured by Nihon Bunko K.K., Japan under the following conditions.

Column: AC803, 804 manufactured and sold by Showa Denko K.K., Japan
Solvent: chloroform
Flow rate: 1 ml/min
Detector: UV (ultraviolet)

The above mentioned method is especially suitable in the case where the amount of the polystyrene type resin coated on the supporting material is $1 \times 10^{-5}$ to $1 \times 10^{-8}$ g/cm² of the supporting material.

The composite membrane of the present invention is prepared as follows. A polystyrene type resin of the kind as mentioned hereinbefore is dissolved in a solvent to form a coating solution. Then, a polysulfone type resin porous membrane of the kind as mentioned hereinbefore is dipped in the coating solution to form a polystyrene type resin coating on the polysulfone type resin porous membrane.

An explanation with respect to the solvent for the polystyrene type resin will be given below. A difficulty accompanying the formation of a coating of a polystyrene type resin on a polysulfone type resin porous membrane resides in the choice of a solvent for the polystyrene type resin. This is so because the polysulfone type resins tend to be corroded by solvents. Illustratively stated, the polysulfone type resins dissolve in many kinds of solvents, for example, aromatic solvents such as benzene, styrene monomer, divinylbenzene, xylene and the like; chlorinated hydrocarbons such as dichloromethane and the like; and polar solvents such as tetrahydrofuran, dimethylformamide and the like. Acetone does not dissolve the polysulfone type resin but often causes stress cracks or cracks in the polysulfone type resin membranes.

The porous membrane prepared from a polysulfone type resin is more sensitive to organic solvents than the pellets and film prepared from a polysulfone type resin. The polysulfone type porous membrane is apt to swell by the influence of even such solvent as will not dissolve the polysulfone type resins, such as acrylonitrile. For example, in the steps of dipping a polysulfone type resin membrane in acrylonitrile and drying, the membrane is apt to swell and shrink irreversibly, so that the surface pore structure of the skin layer effective for gas separation is liable to be destroyed and the pore structure cannot be restored.

As the solvent for the polystyrene type resin, there may, in principle, be employed any solvent which dissolves the polystyrene type resin and does not corrode or swell the polysulfone type resin porous membrane. As preferable examples of such solvent, there may be mentioned cyclic compounds such as cyclopentane, cyclopentene, cyclohexane, cyclohexene, cycloheptane, cycloheptene, cyclooctane, cyclooctene and the like; aliphatic hydrocarbons such as pentane, hexane, heptane, octane and the like; aliphatic alcohols such as methanol, ethanol, propanol, butanol and the like; and mixtures thereof. In the case where a mixture of solvents is employed, the mixture may be a combination of any one of the above-mentioned solvent and such organic solvent as will dissolve the polysulfone type resin. In this case, the proportions of the solvents are varied to obtain a mixed solvent which does not corrode the surface of the polysulfone type resin membrane in forming thereon a coating of a polystyrene type resin. Of the above-mentioned solvents, cyclic compounds such as cyclopentane, cyclopentene, cyclohexene and cyclohexane are more preferred, and cyclohexane is most preferred. The reason why cyclohexane is most preferred is as follows. The polysulfone type resin porous membrane is not corroded by cyclohexane. Therefore, when a coating of a polystyrene type resin on the polysulfone type resin porous membrane is effected using cyclohexane as a solvent for the polystyrene type resin, the porous structure of the skin layer effective for gas separation is not influenced by cyclohexane. Further, it has been confirmed that the polystyrene type resin dissolves in cyclohexane to form a stable homogeneous solution, and that when the solution of the polystyrene type resin in cyclohexane is applied to the surface of a porous polysulfone type resin membrane and dried, a uniform coating is formed on the surface of the porous membrane.

The concentration of the polystyrene type resin in the coating solution is generally in the range of from $1 \times 10^{-5}$ to 10% by weight, preferably $1 \times 10^{-3}$ to 5% by weight. When the concentration is more than 10% by weight, the coating layer becomes so thick that the gas permeability of the composite membrane is unfavorably decreased. On the other hand, when the concentration is less than $1 \times 10^{-5}$% by weight, the selective gas permeability of the resulting composite membrane tends to be unfavorably small.

The thickness of the coating formed by using the coating solution having a polymer concentration in the above-mentioned range is 5 μm or less. When a coating solution having a polymer concentration of $10^{-1}$% by weight or less is used to form a coating, the thickness of the resulting coating is so thin that the thickness of the resulting coating cannot be determined even by using an electron microscope. However, the amount of the polystyrene type resin coated on the surface of the polysulfone type resin membrane can be determined by the above-mentioned pyrolysis gas chromatography or high speed liquid chromatography.

The coating temperature is slightly varied depending on the kind of the polystyrene type resin, molecular weight of the polystyrene type resin, kind of solvent and concentration of the coating solution, but preferably in the range of $\theta$ point minus 30° C. to $\theta$ point plus 35° C. For example, when a polystyrene is chosen as the polystyrene type resin and cyclohexane hexane as the solvent, the $\theta$ point is about 35° C. and, hence, the preferable coating temperature range is 5° to 70° C. In this connection, the smaller the molecular weight and the lower the concentration of the polystyrene type resin in the coating solution, the longer the coating solution is stably homogeneous even at a low temperature. When the coating temperature is less than $\theta$ point minus 30° C., precipitation of crystals occurs and the solvent is sometimes solidified and, hence, the coating cannot be effected. On the other hand, when the coating temperature is more than $\theta$ point plus 35° C., the solvent tends to be unfavorably evaporated.

The time required for coating is slightly varied depending nn the concentration of the polymer in the coating solution, molecular weight of the polystyrene type resin to be coated and the like, but the coating time is generally in the range of 30 seconds to 24 hours. In forming a coating, a pressure difference may be produced between the inside and outside of the membrane to shorten the time required for the coating. Alternatively, the coating may be carried out simply by dipping the polysulfone type resin membrane in a coating solution for one day.

The gas permeability and selective gas permeability of the composite membrane may be determined by the vacuum method in which a pressure difference of 100 to 760 mmHg is produced across the both sides of a membrane. With respect to the method of determining the gas permeability and selective gas permeability, reference may be made to "Kobunsi Ronbun Shu", vol. 134, No. 10, pp. 729–736 (1977). The determination is preferably effected at 25° C.

In the present invention, the polysulfone type resin to be used as the support membrane exhibits a high selective gas permeability ($\alpha_{sup}$) for a wide variety of gaseous mixtures. Also, the polystyrene type resin to be used as the coating material exhibits a high selective gas permeability ($\alpha_{coat}$) for a wide variety of gaseous mixtures. When the selective gas permeability of the composite membrane of the present invention is expressed as $\alpha_{comp}$, the following relationship is often observed: $\alpha_{coat} \geq \alpha_{sup}$ and $\alpha_{coat} > \alpha_{comp}$. Because both of $\alpha_{sup}$ and $\alpha_{coat}$ are large, $\alpha_{comp}$ is also large with respect to a wide variety of gaseous mixtures.

The composite membrane of the present invention may further comprise a protective layer coated on at least one surface of the above-obtained composite membrane. The protective layer may be made of silicones and fluorosilicone rubbers such as poly(dimethylsiloxane), poly(phenylmethylsiloxane), poly(trifluoropropylmethylsiloxane), poly(di-trifluoropropylsiloxane) and the like; polymers and copolymers comprising fluorine- and/or chlorine-substituted ethylene monomers or propylene monomers, such as polyvinylidene fluoride, polytetrafluoroethylene, polyhexafluoropropylene, polychlorotrifluoroethylene and the like; perfluoroalkyl vinyl ethers; fluorinated polyalkyl acrylates, fluorinated polyacrylates and copolymers thereof, such as poly-2,2,2-trifluoroethyl acrylate, poly-2,2,2-trifluoroethyl methacrylate, poly-2,2,3,3-tetrafluoropropyl acrylate, poly-2,2,3,3-tetrafluoropropyl methacrylate, polyoctafluoropentyl acrylate, polyheptadecafluorodecyl acrylate, polyheptadecafluorodecyl methacrylate and the like; polyphosphazene and poly(fluorinated phosphazene); polyacetylene and poly(substituted acetylene) such as poly(trimethylsilyl-substituted acetylene).

The protective layer made of the above-mentioned materials is excellent in gas permeability, heat resistance and impact resistance. Therefore, the protective layer can prevent the skin layer from damage caused by the friction between the composite membranes during long-term use, and from deformation of the composite membrane by heat and, further, can prevent a liquid capable of swelling the coating or supporting material from penetrating the composite membrane.

The protective layer preferably has such a thickness that the gas permeability of the composite membrane is not largely decreased. Illustratively stated, the thickness of the protective layer may be varied depending on the kind of the material of the protective coating, but is generally 5 μm or less, preferably 1 μm or less.

The protective layer may be formed on the composite membrane by the same method as mentioned hereinbefore with respect to the formation of a polystyrene type resin coating on the supporting material. Alternatively, the protective layer may be formed by spraying on the surface of the composite membrane a material for the protective layer in the form of a solution.

As mentioned hereinabove, the composite membrane of the present invention is excellent in both gas permeability and selective gas permeability and, hence, can be advantageously used for separating at least one gas from various gaseous mixtures.

The present invention will now be illustrated in more detail by the following Examples that should not be construed as limiting the scope of the invention.

In the Examples, the rejection characteristics of the supporting material (the polysulfone type resin porous membrane), weight average molecular weight of coating polymer, amount of polymer coated on the supporting material, thickness of the coating formed on the supporting material, etc. were determined as follows.

(1) Measurement of rejection characteristics of the supporting material:

One end of a hollow fiber of which the outer and inner diameters had been measured in advance was used as an inlet for water, and the other end of said hollow fiber was used as an outlet for water. The effective length of the fiber was 25 cm; the pressure at the inlet portion was 1.2 kg/cm² or less; the pressure at the outlet portion was 0.8 kg/cm² or more; the average of the pressure in the inlet and outlet portions was 1.0 kg/cm²; and the linear velocity of the water was 1.0 m/sec. Under such conditions, a 5% by weight solution of Dextran T-70 having a weight average molecular weight of 70,000 dissolved in distilled water was passed through the hollow fiber. The concentration of the dextran in the solution flowing out of the hollow fiber was determined using a refractometer when the pressure became constant. Then, the percentage rejection was obtained by the following formula:

$$\text{Percentage rejection (\%)} = \left[1 - \frac{Cd}{0.05}\right] \times 100$$

wherein Cd is the concentration of the dextran in the solution flowing out of the hollow fiber.

(2) Weight average molecular weight (Mw) and number average molecular weight (Mn) of a polystyrene type resin:

$\overline{\text{Mw}}$ and $\overline{\text{Mn}}$ were measured by gel permeation chromatography (GPC) under the following conditions.
GPC measuring apparatus: Model 200 manufactured by Waters Assoc. Co., U.S.A.
Column: Ac 803, 804 manufactured by Showa Denko K.K., Japan
Solvent: chloroform (3) Measurement of the amount of polymer coated on the supporting material:

The amount of polymer coated on the supporting material was determined by pyrolysis gas chromatography or high speed liquid chromatography under the conditions as mentioned hereinbefore.

(4) Measurement of thickness of the coating formed on the supporting material:

The thickness of the coating was determined using a scanning electron photomicrograph of the entire cross section of a composite membrane.

(5) Gas permeability of a composite membrane:

The gas permeability of a composite membrane was evaluated in terms of the permeability for $H_2$ ($Q_{H2}$) which was determined according to the method described in "Kobunshi Ronbun Shu", vol. 134, No. 10, pp. 729–736 (1977).

(6) Selective gas permeability of a composite membrane:

The selective gas permeability of a composite membrane was evaluated in terms of selective permeability constant of $H_2$ over $N_2$ ($\alpha_{N2}^{H2}$). $\alpha_{N2}^{H2}$ was determined as follows. With respect to the composite membrane, the permeability for $H_2$ ($Q_{H2}$) and permeability for $N_2$ ($Q_{N2}$) were each determined according to the method described in "Kobunshi Ronbun Shu", vol. 134, No. 10, pp. 729–736 (1977). Then, $\alpha_{N2}^{H2}$ was obtained by the following formula:

$$\alpha_{N2}^{H2} = Q_{H2}/Q_{N2}$$

EXAMPLES 1 TO 3 AND COMPARATIVE EXAMPLES 1 AND 2

P-3500 (trade name of a polysulfone manufactured and sold by Union Carbide Corp., U.S.A.) as a polysulfone type resin and N-methyl-2-pyrrolidone as a solvent were mixed in a weight ratio of 25:75 to obtain a homogeneous 25% by weight spinning solution of a polysulfone type resin in N-methyl-2-pyrrolidone.

The thus obtained spinning solution was passed through a stainless steel net (mesh size: 2 μm) and, then, extruded from a spinning nozzle to obtain a hollow fiber under the following conditions.
Temperature of spinning solution: 80° C.
Spinning nozzle: an annular hollow fiber spinning nozzle provided with a resin-extruding orifice
Internal coagulating liquid: purified water of 10° C.
External coagulating liquid: purified water of 10° C.
Running-in-air distance (the distance between the tip of the spinning nozzle and the surface of the external coagulating liquid): 1 cm
Spinning rate: 10 m/min Incidentally, the spinning solution was extruded into a nitrogen gas atmosphere and, then, into the external coagulating liquid to avoid the influence of moisture in air.

The thus obtained hollow fiber was sufficiently washed with water at room temperature and then subjected to forced rinsing with water of 30° C. to thoroughly remove the solvent, followed by air-drying in a clean room. The hollow fiber thus prepared is hereinafter referred to as "HF-1". The hollow fiber HF-1 had an inner diameter of 0.25 mm, an outer diameter of 0.55 mm and a membrane thickness of 0.15 mm.

The hollow fiber HF-1 was subjected to determination of percentage rejection of Dextran T-70 (weight average molecular weight: 70,000), permeability for $H_2$ ($Q_{H2}$), and selective permeability constant of $H_2$ over $N_2$ ($\alpha_{N2}^{H2}$) at 25° C. The results are shown in Table 1 given below.

Various kinds of monodisperse polystyrenes (fractions obtained by gel permeation chromatography) different in molecular weight shown in Table 1 given below were separately dissolved in cyclohexane at 50° C. to form 1% by weight solutions of polystyrene in cyclohexane shown in Table 1. The thus obtained solutions were used as coating solutions.

Each of the coating solutions was applied to the outer surface of the hollow fiber HF-1 at 50° C. while maintaining the coating solution temperature at 50° C. as follows. One end of the hollow fiber was clogged with an adhesive. Then, the hollow fiber was evacuated from the open end of the hollow fiber to cause a pressure difference of 600 mmHg between the inside and outside of HF-1. Then, the whole HF-1 was dipped in a coating solution for 3 minutes to form a coating on the outer surface of the hollow fiber, followed by leaving at room temperature for drying. Thus, there were obtained composite membranes.

The permeability for $H_2$ ($P_{H2}$) and selective permeability constant of $H_2$ over $N_2$ ($\alpha_{N2}^{H2}$) of the the thus obtained composite membranes were determined at 25° C. The results are shown in Table 1.

Separately, the polystyrene as indicated in Table 1 was dissolved in benzene to prepare a solution having a polymer concentration of 5% by weight. The resulting solution was cast on a glass plate to form a film. The thus obtained film was put in a hot-air dryer kept at 70° C. to evaporate benzene, and then dried at 80° C. under vacuum for 24 hours to obtain a polystyrene film. The above-obtained polystyrene film was subjected to determination of selective permeability constant of $H_2$ over $N_2$ ($\alpha_{N2}^{H2}$) at 25° C. The results are shown in Table 1.

A polysulfone film was prepared as follows. The same polysulfone as used above was dissolved in chloroform to prepare a solution having a polymer concentration of 5% by weight. The resulting solution was cast on a glass plate to form a film. The thus obtained film was put in a hot-air dryer kept at 50° C. to evaporate chloroform, and then dried at 80° C. under vacuum for 24 hours to obtain a polysulfone film. The above-obtained polysulfone film was subjected to determination of selective permeability constant of $H_2$ over $N_2$ ($\alpha_{N2}^{H2}$) at 25° C. The results are shown in Table 1.

Figure 3:
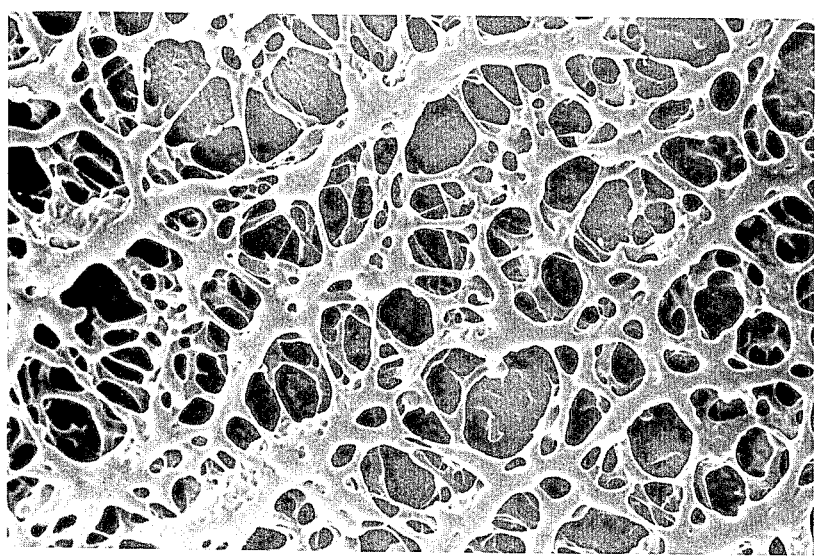
FIG. 3 is a scanning electron photomicrograph (magnification: ×1,000) showing a portion of the outer surface of a composite membrane obtained in Example 1 as will be given later.

In FIG. 3, there is shown a scanning electron photomicrograph (magnification: ×1,000) of a portion of the outer surface of a composite membrane obtained in Example 1. As is apparent from FIG. 3, a porous polystyrene coating having large pores is formed on the outer surface of the polysulfone type resin porous membrane.

EXAMPLE 4

P-3500 (trade name of a polysulfone manufactured and sold by Union Carbide Corp., U.S.A.) as a polysulfone type resin, N-methyl-2-pyrrolidone as a solvent and tetraethylene glycol (hereinafter referred to as "TEG") as an additive were mixed in a weight ratio of 25:66:9 to obtain a homogeneous resin solution. The obtained resin solution was subjected to spinning operation in substantially the same manner as mentioned above with respect to the preparation of HF-1 and then dried on a clean bench to obtain a dried hollow fiber. The obtained hollow fiber is hereinafter referred to as "HF-2". The hollow fiber HF-2 had an inner diameter of 0.25 mm, an outer diameter of 0.55 mm and a membrane thickness of 0.15 mm.

HF-2 was subjected to determination of percentage rejection of Dextran T-70 (weight average molecular weight: 70,000), permeability for $H_2$ ($Q_{H2}$), and selective permeability constant of $H_2$ over $N_2$ ($\alpha_{N2}^{H2}$) at 25° C. The results are shown in Table 1 given below.

A 2% by weight solution of a monodisperse polystyrene having a weight average molecular weight of 250,000 in cyclohexane was applied to the outer surface of the above-obtained hollow fiber HF-2 in substantially the same manner as in Examples 1 to 3 to form a composite membrane.

The thus obtained composite membrane was subjected to determination of permeability for $H_2$ and selective permeability constant ($\alpha_{N2}^{H2}$) at 25° C. The results are shown in Table 1 given below.

COMPARATIVE EXAMPLE 3

P-3500 (trade name of a polysulfone manufactured and sold by Union Carbide Corp., U.S.A.) as a polysulfone type resin, N-methyl-2-pyrrolidone as a solvent and TEG as an additive were mixed in a weight ratio of 15:75:10 to form a homogeneous resin solution. The thus obtained resin solution was subjected to spinning operation and drying in substantially the same manner as mentioned with respect to the preparation of HF-2 to obtain a hollow fiber. The thus obtained hollow fiber is hereinafter referred to as "HF-3". The hollow fiber HF-3 had an inner diameter of 0.20 mm, an outer diameter of 0.50 mm and a membrane thickness of 0.15 mm.

HF-3 was subjected to determination of percentage rejection of Dextran T-70 (weight average molecular weight: 70,000), permeability for $H_2$, and selective permeability constant ($\alpha_{N2}^{H2}$) at 25° C. The results are shown in Table 1 given below.

A 2% weight solution of a monodisperse polystyrene having a weight average molecular weight of 250,000 ($\overline{Mw}/\overline{Mn}=1.1$) in cyclohexane was applied to the outer surface of the above-obtained hollow fiber HF-3 in substantially the same manner as in Examples 1 to 3 to form a composite membrane.

The thus obtained composite membrane was subjected to determination of permeability for $H_2$ ($Q_{H2}$) and selective permeability constant of $H_2$ over $N_2$ ($\alpha_{N2}^{H2}$) at 25° C. The results are shown in Table 1 given below.

EXAMPLE 5

VICTREX (trade name of a polyether sulfone manufactured and sold by ICI Company, England) as the polysulfone type resin and hexamethylphosphoric triamide as the solvent were mixed in a weight ratio of 20:80 to obtain a homogenous 20% by weight solution of the polyether sulfone in hexamethylphosphoric triamide. The obtained solution was used as a spinning solution and the spinning solution was subjected to spinning operation and drying in substantially the same manner as in Example 1 to obtain a dried hollow fiber.

The above-obtained hollow fiber had an inner diameter of 0.25 mm, an outer diameter of 0.55 mm and a membrane thickness of 0.15 mm.

The thus obtained dried hollow fiber was subjected to determination of percentage rejection of Dextran T-70 (weight average molecular weight: 70,000), permeability for $H_2$ ($Q_{H2}$), and selective permeability constant of $H_2$ over $N_2$ ($\alpha_{N2}^{H2}$) at 25° C. The results are shown in Table 1.

The same solution of a monodisperse polystyrene having a weight average molecular weight of 250,000 (Mw/Mn=1.1) in cyclohexane as used in Example 1 was applied to the outer surface of the above-obtained hollow fiber membrane in substantially the same manner as in Example 1.

The thus obtained composite membrane was subjected to determination of permeability for $H_2$ ($Q_{H2}$) and selective permeability constant of $H_2$ over $N_2$ ($\alpha_{N2}^{H2}$) at 25° C. The results are shown in Table 1.

Separately, the same polyethersulfone as used above was dissolved in chloroform to prepare a solution having a polymer concentration of 5% by weight. The resulting solution was cast on a glass plate to form a film. The thus obtained film was put in a hot-air dryer kept at 50° C. to evaporate chloroform, and then dried at 80° C. under vacuum for 24 hours to obtain a polyethersulfone film. The above-obtained polyethersulfone film was subjected to determination of selective permeability constant of $H_2$ over $N_2$ ($\alpha_{N2}^{H2}$) at 25° C. The results are shown in Table 1.

TABLE 1

| | Coating | | | | |
|---|---|---|---|---|---|
| | Polymer | | | Coating conditions | |
| Example No. | Kind | Weight average molecular weight (Mw) | Weight average molecular weight (Mw) / Number average molecular weight (Mn) | Concentration of polystyrene in coating solution (% by weight) | Coating temperature (°C.) |
| Comparative Example 1 | Polystyrene | 500 | 1.01 | 1.0 | 50 |
| Comparative Example 2 | " | 1000 | 1.0 | " | " |
| Example 1 | " | 25 × 10⁴ | 1.1 | " | " |
| Example 2 | " | 50 × 10⁴ | " | " | " |
| Example 3 | " | 200 × 10⁴ | " | " | " |
| Example 4 | " | 25 × 10⁴ | " | 2.0 | 50 |
| Comparative Example 3 | " | " | " | 1.0 | " |
| Example 5 | " | 50 × 10⁴ | " | " | " |

| | Hollow fiber (supporting material) | | | Composite hollow fiber membrane | | Polystyrene film |
|---|---|---|---|---|---|---|
| Example No. | Material | $Q_{H2}$ | $\alpha_{N_2}^{H_2}$ | Rejection of Dextran T-70 (Mw: 70,000) (%) | $Q_{H2}$ | $\alpha_{N_2}^{H_2}$ | $\alpha_{N_2}^{H_2}$ |
| Comparative Example 1 | Polysulfone | 1.5 × 10⁻³ | 3.7 | 95 | 3.0 × 10⁻⁵ | 2.0 | 2.0 |
| Comparative Example 2 | " | " | " | " | 5.0 × 10⁻⁵ | 4.0 | 5.0 |

TABLE 1-continued

| | | | | | | | |
|---|---|---|---|---|---|---|---|
| Example 1 | " | " | " | " | $2.0 \times 10^{-4}$ | 31 | 75 |
| Example 2 | " | " | " | " | $1.5 \times 10^{-4}$ | 35 | 90 |
| Example 3 | " | " | " | " | $2.5 \times 10^{-4}$ | 40 | 110 |
| Example 4 | " | $1.8 \times 10^{-3}$ | 3.9 | 98 | $5.0 \times 10^{-4}$ | 40 | 75 |
| Comparative Example 3 | " | $3.0 \times 10^{-3}$ | 3.0 | 10 | $1.0 \times 10^{-3}$ | 3.5 | " |
| Example 5 | Polyethersulfone | $5.0 \times 10^{-4}$ | 10.0 | 98 | $1.0 \times 10^{-4}$ | 55 | 90 |

Note
(1) Selective permeability constants of hydrogen over nitrogen $\alpha_{N_2}^{H_2}$ with respect to the polysulfone film and polyethersulfone film were 70 and 84, respectively.
(2) $Q_{H_2}$: Permeability for $H_2$ [$cm^3$ (STP)/$cm^2 \cdot sec \cdot cmHg$]

EXAMPLE 6

Various kinds of gases as indicated in Table 2 were passed through the composite membrane as obtained in Example 4 to determine the permeability for the gases as indicated in Table 2 and selective permeability constant of $H_2$ over the gases as indicated in Table 2. The results are shown in Table 2.

TABLE 2

| Kind of gas | Q (*1) | $\alpha_{gas}^{H_2}$ (*2) |
|---|---|---|
| $H_2$ | $5 \times 10^{-4}$ | — |
| $N_2$ | $1.25 \times 10^{-5}$ | 40 (*3) |
| $O_2$ | $7.5 \times 10^{-5}$ | 6.7 (*3) |
| Ar | $5.0 \times 10^{-5}$ | 10 |
| $CH_4$ | $2.0 \times 10^{-5}$ | 25 |
| $C_2H_4$ | $1.3 \times 10^{-5}$ | 38 |

Note:
(*1) Q: permeability [$cm^3$ (STP)/$cm^2 \cdot sec \cdot cmHg$]
(*2) $\alpha_{gas}^{H_2}$: selective permeability constant of hydrogen gas over various kinds of gases with respect to this composite membrane.
(*3) $\alpha_{N_2}^{O_2}$ of the coating material (polystyrene: MW = $25 \times 10^4$) was 6.4.

As is apparent from Table 2, the composite membrane of the present invention can be advantageously used for separating various kinds of gases.

EXAMPLES 7 TO 20 AND COMPARATIVE EXAMPLE 4

A monodisperse polystyrene having a weight average molecular weight of 250,000 (Mw/Mn=1.1) as a coating polymer was dissolved in cyclohexane as the solvent at 50° C. to prepare homogeneous coating solutions having polystyrene concentrations as indicated in Table 3.

Each of the coating solutions was applied to the outer surface of the same hollow fiber HF-2 as prepared in Example 4 in substantially the same manner as in Example 4, except that the above-prepared coating solutions were used instead of that used in Example 4 and that the coating solution temperature was 40° C. instead of 50° C.

Each of the above-obtained composite membranes was subjected to determination of permeability for $H_2$ and selective permeability constant ($\alpha_{N_2}^{H_2}$) at 25° C. The results are shown in Table 3.

Further, the amount of polystyrene coated on the outer surface of the hollow fiber HF-2 was examined by pyrolyzing the composite membranes and subjecting the resulting gases to gas chromatography in the manner as described before. The results are also shown in Table 3.

Figure 1:
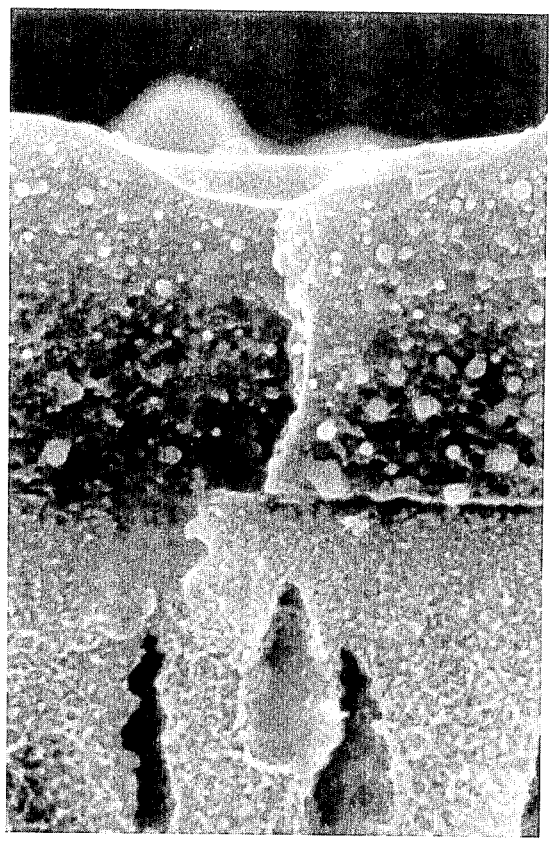
FIG. 1 is a scanning electron photomicrograph (magnification: ×20,000) of a portion of a freeze-broken cross section of a composite membrane obtained in Example 8 as will be given later.
Figure 2:
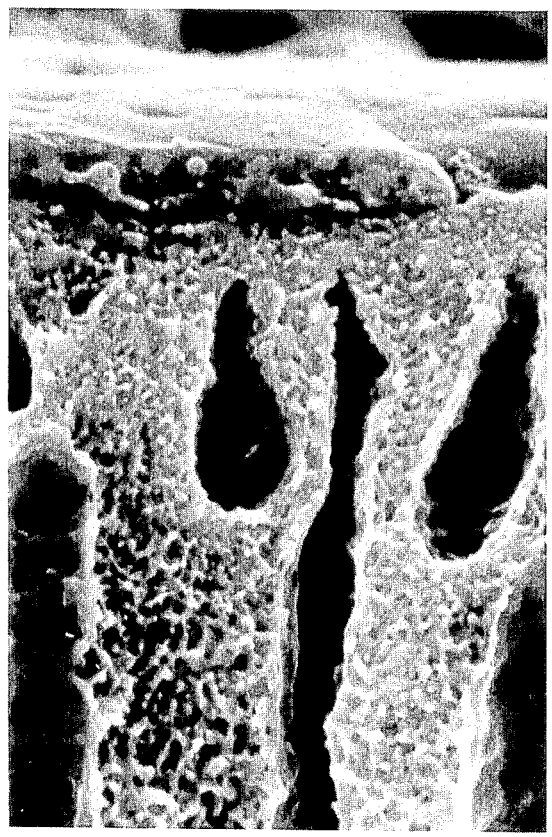
FIG. 2 is a scanning electron photomicrograph (magnification: ×20,000) of a portion of a freeze-broken cross section of a composite membrane obtained in Example 9 as will be given later.
Figure 4:
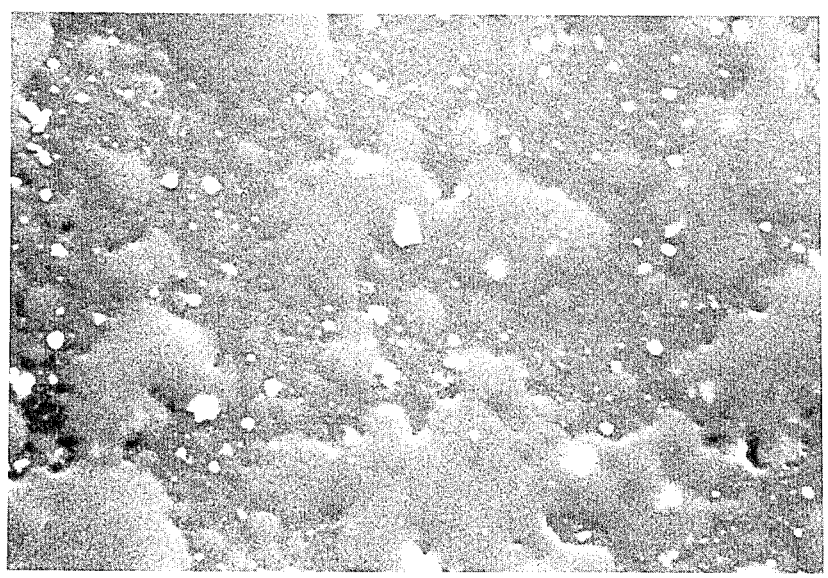
FIG. 4 is a scanning electron photomicrograph (magnification: ×20,000) showing a portion of the outer surface of a composite membrane obtained in Example 12 as will be given later.

In FIG. 1, there is shown a scanning electron photomicrograph (magnification: ×20,000) of a portion of a freeze-broken cross section of a composite membrane obtained in Example 8. In FIG. 2, there is shown a scanning electron photomicrograph (magnification: ×20,000) of a portion of a freeze-broken cross section of a composite membrane obtained in Example 9. In FIGS. 1 and 2, each cross section was taken along the plane perpendicular to the lengthwise direction of the composite membrane. In FIG. 4, there is shown a scanning electron photomicrograph (magnification: ×1,000) of a portion of the outer surface of a composite membrane obtained in Example 1. As is seen from FIGS. 1, 2 and 4, a porous polystyrene coating is formed on the polysulfone type resin porous membrane.

TABLE 3

| Example No. | Concentration of polystyrene in coating solution (% by weight) | Coating conditions Coating time | Coating conditions Pressure difference | $Q_{H_2}$ [$cm^3$ (STP)/ $cm^2 \cdot sec \cdot cmHg$] | $\alpha_{N_2}^{H_2}$ | Amount of polystyrene coated on the hollow fiber (g/$cm^2$) |
|---|---|---|---|---|---|---|
| 7 | 10 | 3 min | 600 mmHg | $7.0 \times 10^{-5}$ | 33 | $2.5 \times 10^{-4}$ |
| 8 | 5 | " | " | $9.0 \times 10^{-5}$ | 35 | $1.0 \times 10^{-4}$ |
| 9 | 2 | " | " | $1.5 \times 10^{-4}$ | 40 | $6.0 \times 10^{-5}$ |
| 10 | 1 | " | " | $2.0 \times 10^{-4}$ | 31 | $2.5 \times 10^{-5}$ |
| 11 | 0.5 | " | " | $2.2 \times 10^{-4}$ | 35 | $7.5 \times 10^{-6}$ |
| 12 | 0.25 | " | " | $2.0 \times 10^{-4}$ | 29 | $3.0 \times 10^{-6}$ |
| 13 | 0.13 | " | " | $2.9 \times 10^{-4}$ | 28 | $1.5 \times 10^{-6}$ |
| 14 | 0.062 | " | " | $4.8 \times 10^{-4}$ | 55 | $6.5 \times 10^{-7}$ |
| 15 | 0.031 | " | " | $3.5 \times 10^{-4}$ | 28 | $4.0 \times 10^{-7}$ |
| 16 | 0.015 | " | " | $3.2 \times 10^{-4}$ | 24 | $3.0 \times 10^{-7}$ |
| 17 | 0.0078 | " | " | $2.5 \times 10^{-4}$ | 28 | $2.5 \times 10^{-7}$ |
| 18 | 0.0039 | " | " | $2.5 \times 10^{-4}$ | 15 | " |
| 19 | 0.0019 | " | " | $1.8 \times 10^{-4}$ | 22 | $2.0 \times 10^{-7}$ |
| 20 | $2.5 \times 10^{-4}$ | " | " | $5.7 \times 10^{-4}$ | 16 | " |
| Comparative Example 4 | $10^{-5}$ | " | " | $1.9 \times 10^{-3}$ | 3.1 | $<10^{-8}$ |

EXAMPLES 21 TO 27

A monodisperse polystyrene having a weight average molecular weight of 250,000 (Mw/Mn=1.1) as coating polymer was dissolved in cyclohexane as solvent at 50° C. to prepare a homogeneous coating solution containing the monodisperse polystyrene at a concentration of 0.0078% by weight.

The coating solution was applied to the outer surface of the same hollow fiber HF-2 as prepared in Example 4 in substantially the same manner as in Example 4, except that the above-prepared coating solution was used instead of that employed in Example 4 and that the coating solution temperature was as indicated in Table 4 instead of 50° C. The thus obtained composite membranes were allowed to stand at 20° C. for 24 hours to remove solvent. With respect to the obtained composite membranes, the permeability for $H_2$ ($Q_{H2}$) and selective permeability constant of $H_2$ over $N_2$ ($\alpha_{N2}^{H2}$) were determined at 25° C. The results are shown in Table 4.

TABLE 4

| Example No. | Coating temperature (°C.) | $Q_{H2}$* | $\alpha_{N2}^{H2}$ |
|---|---|---|---|
| 21 | 10 | $3.0 \times 10^{-4}$ | 30 |
| 22 | 20 | $3.4 \times 10^{-4}$ | 35 |
| 23 | 30 | $3.2 \times 10^{-4}$ | 30 |
| 24 | 40 | $3.0 \times 10^{-4}$ | 28 |
| 25 | 50 | $2.5 \times 10^{-4}$ | 27.3 |
| 26 | 60 | $4.0 \times 10^{-4}$ | 18 |
| 27 | 70 | $4.5 \times 10^{-4}$ | 15 |

Note:
*$Q_{H2}$ [cm$^3$(STP)/cm$^2$ · sec · cmHg]

EXAMPLE 28

A coating of a monodisperse polystyrene having a weight average molecular weight of $25 \times 10^4$ was formed on the outer surface of the same hollow fiber HF-1 as prepared in Example 1 in the same manner as in Example 1. The polystyrene coating of the resulting composite membrane was uniformly irradiated for 30 minutes with ultraviolet rays emitted from Neoline Rapid Master (trade name of a low pressure mercury lamp manufactured and sold by Toshiba Co., Ltd., Japan) (24.5 W) placed at a distance of 30 cm from the composite membrane while rotating the composite membrane at 6 rpm. With respect to the thus treated composite membrane, the permeability for $H_2$ ($Q_{H2}$) and selective permeability constant of $H_2$ over $N_2$ ($\alpha_{N2}^{H2}$) were determined at 25° C. The results are shown in Table 5.

The composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

EXAMPLE 29

200 g of a mixture of styrene and acrylonitrile (styrene/acrylonitrile molar ratio=99:1) was dissolved in 1 liter of methyl ethyl ketone. To the resulting solution was added azobisisobutyronitrile in an amount of 0.5% by weight based on the total amount of the monomers. The resulting mixture was heated at 70° C. for 24 hours under reflux. Thereafter, the reaction mixture was poured into 10 liters of methanol to precipitate the resulting copolymer. The precipitates were filtered off and dried.

The above-prepared copolymer was subjected to determination of weight average molecular weight by the gel permeation chromatography method. As a result, it was found that the copolymer had a weight average molecular weight of 250,000. Further, the copolymer was analyzed by PGC. As a result, it was confirmed that the contents of styrene monomer unit and acrylonitrile monomer unit in the copolymer were 99 mol % and 1 mol %, respectively.

The above-obtained copolymer was dissolved in cyclohexane as the solvent at 50° C. to prepare a homogeneous coating solution containing the copolymer at a concentration of 0.05% by weight.

The coating solution was applied at 50° C. to the outer surface of the same hollow fiber HF-1 as prepared in Example 1 in substantially the same manner as in Example 1, except that the above prepared coating solution was used instead of that used in Example 1.

The resulting composite membrane was subjected to determination of permeability of $H_2$ ($Q_{H2}$) and selective permeability constant of $H_2$ over $N_2$ ($\alpha_{N2}^{H2}$) at 25° C. The results are shown in Table 5.

EXAMPLE 30

200 g of a mixture of styrene and methyl acrylate (styrene/methylacrylate molar ratio=99:1) was dissolved in 1 liter of methyl ethyl ketone. To the resulting solution was added azobisisobutyronitrile in an amount of 0.5% by weight based on the total amount of the monomers. The resulting mixture was heated at 70° C. for 24 hours under reflux. Thereafter, the reaction mixture was poured into 10 liters of methanol to precipitate the resulting copolymer. The precipitates were filtered off and dried.

The above-prepared copolymer was subjected to determination of weight average molecular weight by the gel permeation chromatography method. As a result, it was found that the copolymer had a weight average molecular weight of 250,000. Further, the copolymer was analyzed by PGC. As a result, it was confirmed that the contents of styrene monomer unit and methyl acrylate monomer unit in the copolymer were 99 mol % and 1 mol %, respectively.

The above-obtained copolymer was dissolved in cyclohexane as the solvent at 50° C. to prepare a homogeneous coating solution containing the copolymer at a concentration of 0.05% by weight.

The coating solution was applied at 50° C. to the outer surface of the same hollow fiber HF-1 as prepared in Example 1 in substantially the same manner as in Example 1, except that the above prepared coating solution was used instead of that used in Example 1.

The resulting composite membrane was subjected to determination of permeability of $H_2$ ($Q_{H2}$) and selective permeability constant of $H_2$ over $N_2$ ($\alpha_{N2}^{H2}$) at 25° C. The results are shown in Table 5.

EXAMPLE 31

200 g of a mixture of styrene and 2-ethylhexyl methacrylate (styrene/2-ethylhexyl methacrylate molar ratio=99:1) was dissolved in 1 liter of methyl ethyl ketone. To the resulting solution was added azobisisobutyronitrile in an amount of 0.5% by weight based on the total amount of the monomers. The resulting mixture was heated at 70° C. for 24 hours under reflux. Thereafter, the reaction mixture was poured into 10 liters of methanol to precipitate the resulting copolymer. The precipitates were filtered off and dried.

The above-prepared copolymer was subjected to determination of weight avergge molecular weight by the gel permeation chromatography method. As a result, it was found that the copolymer had a weight average molecular weight of 250,000. Further, the copolymer was analyzed by PGC. As a result, it was confirmed that the contents of styrene monomer unit and 2-ethylhexyl methacrylate monomer unit in the copolymer were 99 mol % and 1 mol %, respectively.

The above-obtained copolymer was dissolved in cyclohexane as the solvent at 50° C. to prepare a homogeneous coating solution containing the copolymer at a concentration of 0.05% by weight.

The coating solution was applied at 50° C. to the outer surface of the same hollow fiber HF-1 as prepared in Example 1 in substantially the same manner as in Example 1, except that the above prepared coating solution was used instead of that used in Example 1.

The resulting composite membrane was subjected to determination of permeability of $H_2$ ($Q_{H2}$) and selective permeability constant of $H_2$ over $N_2$ ($\alpha_{N2}^{H2}$) at 25° C. The results are shown in Table 5.

of 0.1 mm, an outer diameter of 0.3 mm and a membrane thickness of 0.1 mm.

HF-4 was subjected to determination of percentage rejection of Dextran T-70 (weight average molecular weight: 70,000), permeability for $H_2$ ($Q_{H2}$), and selective permeability constant of $H_2$ over $N_2$ ($\alpha_{N2}^{H2}$).

The results were as follows.
Percentage rejection of Dextran T-70: 95%
$Q_{H2}$: $3 \times 10^{-3}$ cm$^3$(STP)/cm$^2$. sec.cmHg
$\alpha_{N2}^{H2}$: =3.9

(2) Synthesis of Poly(1,4-Divinylbenzene)

Into a round flask equipped with a stirrer and a dropping funnel and having a capacity of 2 liters were charged 1 liter of tetrahydrofuran sufficiently dried with molecular sieves and 100 g of di-isopropylamine and cooled to 4° C. While sufficiently stirring, 100 ml of

TABLE 5

| Example No. | Coating polymer | | Characteristics of composite membrane | |
|---|---|---|---|---|
| | Kind | Weight average molecular weight(Mw) | $Q_{H2}$[cm$^3$(STP)/ cm$^2$ · sec · cmHg] | $\alpha_{N2}^{H2}$ |
| 28 | Polystyrene | $25 \times 10^4$ *1 | $2.0 \times 10^{-4}$ *2 | 55 *2 |
| 29 | Styrene-acrylonitrile copolymer | " | $2.5 \times 10^{-4}$ | 38 |
| 30 | Styrene-methyl acrylate copolymer | " | $2.1 \times 10^{-4}$ | 33 |
| 31 | Styrene-ethylhexyl methacrylate copolymer | " | $2.8 \times 10^{-4}$ | 29 |

Note:
*1: Mw before the irradiation with ultraviolet rays
*2: Values after the irradiation with ultraviolet rays

EXAMPLE 32

(1) Preparation of Hollow Fiber

P-3500 (trade name of a polysulfone manufactured and sold by Union Carbide Corp., U.S.A.) as the polysulfone type resin, N-methyl-2-pyrrolidone as the solvent and a polyethylene glycol having an average molecular weight of 200 were mixed in a weight ratio of 25:66:9 to obtain a homogeneous solution. Hollow fiber membranes were prepared using the thus obtained solution as the spinning solution as follows.

The thus obtained spinning solution was passed through a stainless steel net (mesh size: 2 μm) and, then, extruded from a spinning nozzle to obtain a hollow fiber under the following conditions.
Temperature of spinning solution 60° C.
Spinning nozzle: an annular hollow fiber spinning nozzle provided with a resin-extruding orifice
Internal coagulating liquid: purified water of 10° C.
External coagulating liquid: purified water of 10° C.
Running-in-air distance (the distance between the tip of the spinning nozzle and the surface of the external coagulating liquid): 2 cm
Spinning rate: 10 m/min Incidentally, the spinning solution was extruded into a nitrogen gas atmosphere and, then, into the external coagulating liquid to avoid the influence of moisture in air.

The thus obtained hollow fiber was sufficiently washed with water at room temperature and then subjected to forced rinsing with water of 30° C. to remove the solvent completely, followed by air-drying in a clean room. The hollow fiber thus prepared is hereinafter referred to as "HF-4". HF-4 had an inner diameter a 15% by weight solution of n-butyllithium in n-hexane was added. Then, 130 g of purified 1,4-divinylbenzene was added little by little while maintaining the solution temperature at 20° C. After stirring for 1 hour, 20 ml of methanol was added. The resulting small amount of white precipitates were filtered off and, then, 20 liters of methanol was added to isolate white precipitates of a linear polymer, i.e. poly(1,4-divinylbenzene). The white precipitates were thoroughly washed with methanol and then dried under reduced pressure. The yield was 90%. The weight average molecular weight of the product was determined by gel permeation chromatography (hereinafter often referred to as "GPC") and it was found that the weight average molecular weight was 260,000.

(3) Coating

The above-obtained poly(1,4-divinylbenzene) in the dry state was dissolved in cyclohexane as the solvent at 50° C. to prepare a homogeneous coating solution having a polymer concentration of 0.125% by weight. In the same manner as in Example 1, there was produced a pressure difference of 700 mmHg between the inside and outside of the hollow fiber HF-4. Thereafter, the outer surface of the hollow fiber was contacted with the coating solution for 3 minutes while maintaining the solution temperature at 50° C. Then, the hollow fiber was taken out of the coating solution and dried at 20° C. to evaporate the solvent.

With respect to the thus obtained composite membrane, the permeability for $H_2$ ($Q_{H2}$) and selective permeability constant of $H_2$ over $N_2$ ($\alpha_{N2}^{H2}$) were determined at 25° C. As a result, it was found that $Q_{H2}$ was $4.2 \times 10^{-4}$ cm$^3$(STP)/cm$^2$.sec.cmHg and ($\alpha_{N2}^{H2}$) was 37.

Separately, the above-obtained poly(1,4-divinylbenzene) was dissolved in benzene instead of cyclohexane at room temperature to prepare a homogeneous solution having a polymer concentration of 5% by weight. The obtained solution was cast on a glass plate to form a 100 μm-thick film. With respect to the obtained film, the selective permeability constant of H$_2$ over N$_2$ ($\alpha_{N2}^{H2}$) was determined at 25° C. and found to be 130.

EXAMPLE 33

In the same manner as in Example 32, a composite membrane comprised of the hollow fiber HF-4 coated with poly(1,4-divinylbenzene) was prepared. Then, the outer surface of the composite hollow fiber membrane was irradiated with ultraviolet rays emitted from Neoline Rapid Master (trade name of a low pressure mercury lamp manufactured and sold by Toshiba Co., Ltd., Japan) (24.5 W) placed at a distance of 30 cm from the composite membrane for 3 hours while rotating the composite membrane.

With respect to the above-treated composite membrane, the permeability for H$_2$ (Q$_{H2}$) and selectivity permeability constant of H$_2$ over N$_2$ ($\alpha_{N2}^{H2}$) were determined. As a result, it was found that the permeability for H$_2$ (Q$_{H2}$) was $1.9 \times 10^{-4}$ cm$^3$(STP)/cm$^2$.sec.cmHg and the selective permeability constant of H$_2$ over N$_2$ ($\alpha_{N2}^{H2}$) was 43.

Thereafter, the composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

Separately, the same poly(1,4-divinylbenzene) as prepared in Example 32 was dissolved in benzene to prepare a poly(1,4-divinylbenzene) solution having a polymer concentration of 5% by weight. The obtained solution was cast on a glass plate to form a film. Then, the film was irradiated with ultraviolet rays in substantially the same manner as mentioned above. With respect to the thus treated film, the selective permeability constant of H$_2$ over N$_2$ ($\alpha_{N2}^{H2}$) was determined and found to be 150.

Then, the film was dipped in cyclohexane and heat treated in substantially the same manner as mentioned above. The weight of the treated film was determined and compared with that before the treatment. As a result, it was found that there was no change in weight caused by the treatment.

EXAMPLE 34

In the same manner as in Example 32, a composite membrane comprised of the hollow fiber HF-4 coated with poly(1,4-divinylbenzene) was prepared. The obtained composite membrane was heated in a hot-air dryer at 120° C. for 24 hours. Then, with respect to the thus obtained composite membrane, the permeability for H$_2$ (Q$_{H2}$) and selective permeability constant of H$_2$ over N$_2$ ($\alpha_{N2}^{H2}$) were determined at 25° C. As a result, it was found that Q$_{H2}$ was $2.2 \times 10^{-4}$ cm$^3$(STP)/cm$^2$.sec.cmHg and ($\alpha_{N2}^{H2}$) was 55.

Thereafter, the composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

Separately, the same poly(1,4-divinylbenzene) as prepared in Example 32 was dissolved in benzene to prepare a poly(1,4-divinylbenzene) solution having a polymer concentration of 5% by weight. The obtained solution was cast on a glass plate to form a film. Then, the film was heated in a hot-air dryer at 120° C. for 24 hours. With respect to the thus obtained film, the selective permeability constant of H$_2$ over N$_2$ ($\alpha_{N2}^{H2}$) was determined at 25° C. and found to be 140.

Then, the film was dipped in cyclohexane and heat treated in the substantially the same manner as mentioned above. The weight of the treated film was determined and compared with that before the treatment. As a result, it was found that there was no change in weight caused by the treatment.

EXAMPLE 35

In the same manner as in Example 32, a composite membrane comprised of the hollow fiber HF-4 coated with poly(1,4-divinylbenzene) was prepared. The obtained composite membrane was dipped in a 0.1% by weight solution of laurel peroxide in cyclohexane for 3 seconds, followed by air-drying.

Then, the composite membrane was heated in a hot-air dryer at 120° C. for 24 hours. With respect to the thus treated composite membrane, the permeability for H$_2$ (Q$_{H2}$) and selective permeability constant of H$_2$ of N$_2$ ($\alpha_{N2}^{H2}$) were determined at 25° C. As a result, it was found that Q$_{H2}$ was $2.8 \times 10^{-4}$ cm$^3$(STP)/cm$^2$.sec.cmHg and $\alpha_{N2}^{H2}$ was 53.

Thereafter, the composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

Separately, the same poly(1,4-divinylbenzene) as prepared in Example 32 was dissolved in benzene to prepare a poly(1,4-divinylbenzene) solution having a polymer concentration of 5% by weight. The obtained solution was cast on a glass plate using a doctor knife to form a coating having a thickness of 100 μm, followed by air-drying at 80° C. to evaporate the solvent. Thus, a film was formed on the glass plate. The film on the glass plate was dipped in a 0.1% solution of lauryl peroxide in cyclohexane for 3 seconds. After drying at 25° C. for 1 hour, the film was heated in a hot-air dryer at 120° C. for 24 hours.

With respect to the thus obtained film, the selective permeability constant of H$_2$ over N$_2$ ($\alpha_{N2}^{H2}$) was determined at 25° C. and found to be 130. Then, the film was dipped in cyclohexane and heat treated in substantially the same manner as mentioned above. The weight of the treated film was determined and compared with that before the treatment. As a result, it was found that there was no change in weight caused by the treatment.

EXAMPLE 36

(1) Synthesis of linear poly(1,3-divinylbenzene)

Into a three-necked flask having a capacity of 2 liters were charged 1 liter of dried tetrahydrofuran and 100 g of di-isopropylamine and, then, 100 ml of a 15% by weight solution of n-butyllithium in n-hexane. While stirring the mixture by means of a magnetic stirrer, 130 g of (1,3-divinylbenzene) was dropwise added. The stirring was continued at room temperature for 4 hours to complete the reaction. The reaction mixture was then poured into 5 liters of methanol. The obtained white precipitates were filtered off and dried to obtain the intended polymer. The weight average molecular weight of the obtained polymer was determined by GPC and found to be 220,000.

The obtained poly(1,3-divinylbenzene) was dissolved in cyclohexane at 50° C. to prepare a 0.125% by weight solution of poly(1,3-divinylbenzene) in cyclohexane. Substantially the same procedures as in Example 32 were repeated to form a coating of poly(1,3-divinylbenzene) on the outer surface of the same hollow fiber HF-4 as prepared in Example 32, except that the above-prepared coating solution was used instead of that used in Example 32. With respect to the thus obtained composite membrane, the permeability for $H_2$ ($Q_{H2}$) and selective permeability constant of $H_2$ over $N_2$ ($\alpha_{N2}^{H2}$) were determined. As a result, it found that $Q_{H2}$ was $4.3 \times 10^{-4}$ cm$^3$(STP)/cm$^2$.sec.cmHg and $\alpha_{N2}^{H2}$ was 30.

Poly(1,3-divinylbenzene) was dissolved in benzene to prepare a solution having a polymer concentration of 5% by weight. The obtained solution was cast on a glass plate to form a film. With respect to the obtained film, the selective permeability constant of $H_2$ over $N_2$ ($\alpha_{N2}^{H2}$) was determined at 25 ° C. and found to be 120.

EXAMPLE 37

In the same manner as in Example 36, a composite hollow fiber membrane comprised of the hollow fiber HF-4 coated with poly(1,3-divinylbenzene) was prepared. The obtained composite membrane was heated in a hot-air dryer at 120° C. for 24 hours. With respect to the thus obtained composite hollow fiber membrane, the permeability for $H_2$ ($Q_{H2}$) and selective permeability constant of $H_2$ over $N_2$ ($\alpha_{N2}^{H2}$) were determined at 25° C. As a result, it was found that $Q_{H2}$ was $2.5 \times 10^{-4}$ cm$^3$(STP)/cm$^2$.sec.cmHg and $\alpha_{H2}^{/N2}$ was 58. Thereafter, the composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

Separately, the same poly(1,3-divinylbenzene) as prepared in Example 36 was dissolved in benzene to prepare a 5% by weight solution of poly(1,3-divinylbenzene) in benzene. The obtained solution was cast on a glass plate to form a film. Then, the film was heated in a hot-air dryer at 120° C. for 24 hours. With respect to the thus obtained film, the selective permeability constant of $H_2$ over $N_2$ ($\alpha_{N2}^{H2}$) was determind at 25° C. and found to be 160.

Then, the film was dipped in cyclohexane and heat treated in substantially the same manner as mentioned above. The weight of the treated film was determined and compared with that before the treatment. As a result, it was found that there was no change in weight caused by the treatment.

EXAMPLE 38

Substantially the same procedures as in Example 32 were repeated to prepare a copolymer, except that a commercially available divinylbenzene mixture comprising 40.4% by weight of 1,3-divinylbenzene, 17.4% by weight of 1,4-divinylbenzene, 38.4% by weight of ethylvinylbenzene and 3.5% by weight of diethylbenzene was used instead of the purified 1,4-divinylbenzene. Thus, there was obtained a linear copolymer of 1,3-divinylbenzene and 1,4-divinylbenzene having a weight average molecular weight of 160,000.

After drying, the copolymer was dissolved in cyclohexane to prepare a 0.125% by weight solution of the copolymer in cyclohexane. While maintaining the solution temperature at 50° C., the resulting coating solution was applied to the same hollow fiber HF-4 as prepared in Example 32 to produce a composite membrane in substantially the same manner as in Example 32, except that the above-prepared coating solution was used instead of that used in Example 32.

The obtained composite membrane was heated in a hot-air dryer at 90° C. for 24 hours. With respect to the thus obtained composite membrane, the permeability for $H_2$ ($Q_{H2}$) and selective permeability constant of $H_2$ over ($\alpha_{N2}^{H2}$) were determined at 25° C. As a result, it was found that $Q_{H2}$ was $3.9 \times 10^{-4}$ cm$^3$(STP)/cm$^2$.sec.cmHg and was 38.

Thereafter, the composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

Separately, the above-prepared copolymer of 1,3-divinylbenzene and 1,4-divinylbenzene was dissolved in benzene to prepare a 5% by weight solution of the copolymer in benzene. The obtained solution was cast on a glass plate to form a film. The obtained film was heated in a hot-air drying device at 90° C. for 24 hours. With respect to the obtained film, the selective permeability constant of $H_2$ over $N_2$ was determined at 25° C. and found to be 115.

Then, the film was dipped in cyclohexane and heat treated in the substantially the same manner as mentioned above. The weight of the treated film was determined and compared with that before the treatment. As a result, it was found that there was no change in weight caused by the treatment.

EXAMPLE 39

The same poly(1,4-divinylbenzene) ($\overline{M}w=260,000$) as prepared in Example 32 and the same poly(1,3-divinylbenzene) ($\overline{M}w=220,000$) as prepared in Example 36 were blended in a weight ratio of 1:1 and dissolved in cyclohexane to prepare a coating solution having a polymer concentration of 0.1% by weight. While maintaining the coating solution temperature at 50° C., the coating solution was applied to the same hollow fiber HF-4 as prepared in Example 32 in substantially the same manner as in Example 32 to form a coating on the hollow fiber, except that the above-obtained coating solution was used instead of that used in Example 32.

The above-obtained composite membrane was allowed to stand at 90° C. for 24 hours. Then, the treated composite membrane was subjected to determination of permeability for $H_2$ ($Q_{H2}$) and selective permeability constant of $H_2$ over $N_2$ ($\alpha_{N2}^{H2}$) at 25° C. As a result, it was found that $Q_{H2}$ was $3.9 \times 10^{-4}$ cm$^3$(STP)/cm$^2$.sec.cmHg and was 39.

Thereafter, the composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

Separately, the same poly(1,4-divinylbenzene) as prepared in Example 32 and the same 1,3-divinylbenzene as prepared in Example 36 were blended in a weight ratio of 1:1 and dissolved in benzene to prepare a solution having a polymer concentration of 5% by weight. The obtained solution was cast on a glass plate to form a film. The resulting film was allowed to stand at 90° C. for 24 hours. Then the selective permeability constant of $H_2$ over $N_2$ was determined at 25° C. and found to be 120.

Then, the film was dipped in cyclohexane and heat treated in the substantially the same manner as mentioned above. The weight of the treated film was determined and compared with that before the treatment. As a result, it was found that there was no change in weight caused by the treatment.

EXAMPLE 40

Into a round flask equipped with a stirrer and a dropping funnel and having a capacity of 2 liters were charged 1 liter of dried tetrahydrofuran and 100 g of di-isopropylamine and cooled to 4° C. While sufficiently stirring, 100 ml of a 15% by weight solution of n-buthyllithium in n-hexane was added. Then, 130 g of purified 1,4-divinylbenzene was added and stirred for 1 hour while maintaining the solution temperature at 20° C. Then, 100 g of styrene was added and stirred at room temperature for 24 hours.

The reaction mixture was poured into 20 liters of methanol to obtain white precipitates of a linear copolymer of 1,4-divinylbenzene and styrene. The yield was 90%.

The weight average molecular weight of the copolymer was determined by GPC and found to be 200,000.

Further, the copolymer was analyzed by the pyrolysis gas chromatography. As a result, it was confirmed that the contents of styrene monomer unit and 1,4-divinylbenzene monomer unit in the copolymer were both 50 mol %.

The above-obtained copolymer was dissolved in cyclohexane to prepare a coating solution having a polymer concentration of 0.1% by weight. While maintaining the coating solution temperature at 50° C., the coating solution was applied to the same hollow fiber HF-4 as prepared in Example 32 in substantially the same manner as in Example 32 to form a coating on the outer surface of the hollow fiber. Thus, there was obtained a composite membrane.

The obtained composite membrane was heated in a hot-air dryer at 90° C. for 24 hours. With respect to the thus treated composite membrane, the permeability for $H_2$ ($Q_{H2}$) and selective permeability constant of $H_2$ over $N_2$ were determined at 25° C. As a result, it was found that $Q_{H2}$ was $4.9 \times 10^{-4}$ cm$^3$(STP)/ cm$^2$.sec.cmHg and was 45.

Thereafter, the composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

Separately, the above-obtained copolymer was dissolved in benzene to prepare a solution having a polymer concentration of 5% by weight. The obtained solution was cast on a glass plate to form a film. The thus obtained film was heated in a hot-air dryer at 90° C. for 24 hours. With respect to the thus treated film, the selective permeability constant of $H_2$ over $N_2$ was determined at 25° C. and found to be 90.

Then, the film was dipped in cyclohexane and heat treated in the substantially the same manner as mentioned above. The weight of the treated film was determined and compared with that before the treatment. As a result, it was found that there was no change in weight caused by the treatment.

EXAMPLE 41

Into a round flask equipped with a stirrer and a dropping funnel and having a capacity of 2 liters were charged 1 liter of dried tetrahydrofuran and 100 g of di-isopropylamine and cooled to 4° C. Then, while sufficiently stirring, 100 ml of a 15% by weight solution of n-buthyllithium in n-hexane was added. While maintaining the solution temperature at 20° C., 130 g of purified 1,4-divinylbenzene and 100 g of styrene were added. Then, the reaction was allowed to proceed at room temperature for 24 hours. Then, the reaction mixture was poured into 20 liters of methanol to obtain white precipitates of the intended product (random copolymer of styrene and 1,4-divinylbenzene). The yield was 93%.

The weight average molecular weight of the copolymer product was determined by GPC and found to be 210,000.

Further, the copolymer was analyzed by pyrolysis gas chromatography. As a result, it was confirmed that the contents of styrene monomer unit and 1,4-divinylbenzene in the copolymer were both 50 mol %.

The above-obtained polymer product was dissolved in cyclohexane to prepare a coating solution having a polymer concentration of 0.05% by weight. While maintaining the coating solution temperature at 50° C., the coating solution was applied to the same hollow fiber HF-4 as prepared in Example 32 in substantially the same manner as in Example 32 to form a coating on the hollow fiber. Thus, there was obtained a composite membrane.

The above-obtained composite membrane was heated in a hot-air dryer at 90° C. for 24 hours. With respect to the thus treated composite membrane, the permeability of $H_2$ ($Q_{H2}$) and selective permeability constant of $H_2$ over $N_2$ were determined at 25° C. As a result, it was found that $Q_{H2}$ was $4.8 \times 10^{-4}$ cm$^3$(STP)//cm$^2$.sec.cmHg and was 38.

Thereafter, the composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

Separately, the above-obtained random copolymer of styrene and 1,4-divinylbenzene was dissolved in benzene to prepare a solution having a polymer concentration of 5% by weight. The solution was cast on a glass plate to form a film. The thus obtained film was heated at 90° C. in a hot-air dryer for 24 hours. With respect to the thus treated film, the selective permeability constant of $H_2$ over $N_2$ was determined at 25° C. and found to be 100.

Then, the film was dipped in cyclohexane and heat treated in substantially the same manner as mentioned above. The weight of the treated film was determined and compared with that before the treatment. As a result, it was found that there was no change in weight caused by the treatment.

EXAMPLE 42

The same poly(1,4-divinylbenzene) as prepared in Example 32 and Styron 685 (trade name of a polystyrene having a weight average molecular weight of 260,000 manufactured and sold by Asahi-Dow Limited, Japan) were blended in a weight ratio of 1:1 to form a blend polymer. The thus obtained blend polymer was dissolved in cyclohexane at 50° C. to form a coating solution having a polymer concentration of 0.05% by weight. While maintaining the coating solution temperature at 50° C., the coating solution was applied to the same hollow fiber HF-4 as prepared in Example 32 in substantially the same manner as in Example 32 to form a coating on the hollow fiber. Then, the above-obtained coated hollow fiber was dried at 20° C. to evaporate the solvent. Thus, there was obtained a composite membrane.

With respect to the thus obtained composite membrane, the permeability for $H_2$ ($Q_{H2}$) and selective permeability constant of $H_2$ over $N_2$ were determined at 25° C. As a result, it was found that the $Q_{H2}$ was $4.7 \times 10^{-4}$ $cm^3(STP)/cm^2.sec.cmHg$ and was 42.

Separately, the above-obtained blend polymer was dissolved in benzene to prepare a solution having a polymer concentration of 5% by weight. The obtained solution was cast on a glass plate to form a film. With respect to the obtained film, the selective permeability constant of $H_2$ over $N_2$ was determined mined at 25° C. and found to be 90.

EXAMPLE 43

In the same manner as in Example 42, a composite membrane was prepared. The obtained composite membrane was heated at 90° C. in a hot-air dryer for 48 hours. With respect to the thus obtained composite membrane, the permeability for $H_2$ ($Q_{H2}$) and selective permeability constant of $H_2$ over $N_2$ were determined at 25° C. As a result, it was found that $Q_{H2}$ was $3.9 \times 10^{-4}$ $cm^3(STP)//cm^2.sec.cmHg$ and was 45.

Thereafter, the composite membrane was dipped in cyclohexane and then heated at 60° C. under reflux for 5 hours. Thereafter, the weight of the treated composite membrane was determined and compared with that before the treatment. As a result, it was found that there was no change in weight caused by the treatment.

In the same manner as in Example 42, a film was prepared from the same blend polymer as obtained in Example 42. The obtained film was heated at 90° C. in a hot-air dryer for 48 hours. With respect to the thus treated film, the selective permeability constant of $H_2$ over $N_2$ was determined at 25° C. and found to be 100.

Then, the film was dipped in cyclohexane and heat treated in substantially the same manner as mentioned above. The weight of the treated film was determined and compared with that before the treatment. As a result, it was found that there was no change in weight caused by the treatment.

EXAMPLE 44

Into a round flask equipped with a stirrer and a dropping funnel and having a capacity of 2 liters were charged 1 liter of tetrahydrofuran and 100 g of diisopropylamine and cooled to 4° C. Then, while sufficiently stirring, 100 ml of a 15% by weight solution of n-butyllithium in cyclohexane was added. While maintaining the temperature of the solution in the flask at 20° C., 130 g of purified 1,4-divinylbenzene and 1 g of acrylonitrile were added and the polymerization reaction was effected at room temperature for 24 hours. Then, the reaction mixture was poured into 20 liters of methanol to obtain white precipitates of a copolymer of 1,4-divinylbenzene and acrylonitrile.

The copolymer was analyzed by pyrolysis gas chromatography. As a result, it was confirmed that the content of acrylonitrile monomer unit in the copolymer was 1.5 mol % and the balance was 1,4-divinylbenzene monomer unit.

The weight average molecular weight of the copolymer was determined by GPC and found to be 220,000.

The obtained copolymer was dissolved in cyclohexane to prepare a coating solution having a polymer concentration of 0.05% by weight. While maintaining the coating solution temperature at 50° C., the coating solution was applied to the outer surface of the same hollow fiber HF-4 as prepared in Example 32 in substantially the same manner as in Example 32 to form a coating on the hollow fiber, except that the above-prepared coating solution was used instead of that used in Example 32. Thus, there was obtained a composite membrane.

With respect to the above-obtained composite membrane, the permeability for $H_2$ ($Q_{H2}$) and selective permeability constant of $H_2$ over $N_2$ ($\alpha_{N2}^{H2}$) were determined at 25° C. As a result, it was found that $Q_{H2}$ was $2.9 \times 10^{-4}$ $cm^3(STP)/cm^2.sec.cmHg$ and was 42.

Separately, the above-obtained copolymer was dissolved in benzene to prepare a solution having a polymer concentration of 5% by weight. The solution was cast on a glass plate to form a film. With respect to the obtained film, the selective permeability constant of $H_2$ over $N_2$ was determined at 25° C. and found to be 100.

EXAMPLE 45

Substantially the same procedures as in Example 44 were repeated to prepare a copolymer, except that 1 g of methyl acrylate was used instead of 1 g of acrylonitrile. Thus, there was obtained a copolymer of 1,4-divinylbenzene and methyl acrylate.

The copolymer was analyzed by pyrolysis gas chromatography. As a result, it was found that the content of methyl acrylate in the copolymer was 1.0 mol % and the balance was 1,4-divinylbenzene monomer unit.

The weight average molecular weight of the copolymer was determined by GPC and found to be 200,000.

In substantially the same manner as in Example 44, the obtained copolymer was dissolved in cyclohexane and applied to the same hollow fiber HF-4 as prepared in Example 32 to obtain a composite membrane. With respect to the above-obtained composite membrane, the gas permeability for $H_2$ ($Q_{H2}$) and selective permeability constant of $H_2$ over $N_2$ were determined at 25° C. As a result, it was found that $Q_{H2}$ was $3.2 \times 10^{-4}$ $cm^3(STP)/cm^2. sec.cmHg$ and was 38.

The hollow fiber HF-5 was subjected to determination of permeability for $H_2$ ($Q_{H2}$) and selective permeability constant of $H_2$ over $N_2$. As a result, it was found that $Q_{H2}$ was $2.5 \times 10^{-3}$ $cm(STP)//cm^2.sec.cmHg$ and was 4.0.

Separately, the above-obtained copolymer was dissolved in benzene to prepare a solution having a polymer concentration of 5% by weight. The solution was cast on a glass plate to form a film. With respect to the obtained film, the selective permeability constant of $H_2$ over $N_2$ was determined at 25° C. and found to be 95.

EXAMPLE 46

Substantially the same procedures as in Example 44 were repeated to prepare a copolymer, except that 1 g of 2-ethylhexyl methacrylate was used instead of 1 g of acrylonitrile. Thus, there was obtained a copolymer of 1,4-divinylbenzene and 2-ethylhexyl methacrylate.

The copolymer was analyzed by pyrolysis gas chromatography. As a result, it was found that the content of 2-ethylhexyl methacrylate in the copolymer was 0.4 mol % and the balance was 1,4-divinylbenzene monomer unit.

The weight average molecular weight of the copolymer was determined by GPC and found to be 180,000.

In substantially the same manner as in Example 44, the above-obtained copolymer was dissolved in cyclohexane and applied to the same hollow fiber HF-4 as prepared in Example 32 to obtain a composite membrane. With respect to the thus obtained composite membrane, the permeability for $H_2$ ($Q_{H2}$) and selective permeability constant of $H_2$ over $N_2$ were determined at 25° C. As a result, it was found that $Q_{H2}$ was $4.5 \times 10^{-4}$ cm$^3$(STP)/cm$^2$.sec.cmHg and was 33.

Separately, the above-obtained copolymer was dissolved in benzene to prepare a solution having a polymer concentration of 5% by weight. The solution was cast on a glass plate to form a film, and the selective permeability constant of $H_2$ over $N_2$ was determined at 25° C. and found to be 85.

With respect to Examples 32 to 46, the coating polymer, molecular weight of the coating polymer, gas permeation characteristics of the resulting composite membrane, etc. are summarized in Table 6 given below.

were mixed in a weight ratio of 25:75 to obtain a homogeneous 25% by weight solution of the polysulfone type resin in N-methyl-2-pyrrolidone.

The thus obtained spinning solution was passed through a stainless steel net (mesh size: 2 μm) and, then, extruded from a spinning nozzle to obtain a hollow fiber under the following conditions.

Temperature of spinning solution: 80° C.
Spinning nozzle: an annular hollow fiber spinning nozzle provided with a resin-extruding orifice
Internal coagulating liquid: purified water of 10° C.
External coagulating liquid: purified water of 10° C.
Running-in-air distance (the distance between the tip of the spinning nozzle and the surface of the external coagulating liquid): 1 cm
Spinning rate: 10 m/min Incidentally, the spinning solution was extruded into a nitrogen gas atmosphere and, then, into the external coagulating liquid to avoid the influence of the moisture in the air.

The thus obtained hollow fiber was sufficiently washed with water at room temperature and then subjected to forced rinsing with water of 30° C. to remove the solvent completely, followed by air-drying in a clean room. The hollow fiber thus prepared is hereinafter referred to as "HF-5". The hollow fiber HF-5 had an inner diameter of 0.1 mm, an outer diameter of 0.3 mm and a membrane thickness of 0.1 mm.

The hollow fiber HF-5 was subjected to determination of permeability for $H_2$ ($Q_{H2}$) and selective permeability constant of $H_2$ over $N_2$. As a result, it was found that $Q_{H2}$ and were $2.5 \times 10^{-3}$ cm$^3$(STP)/cm$^2$.sec.cmHg and 4.0, respectively.

TABLE 6

| Example No. | Coating polymer | | Composite membrane | | Polymer film | Remarks |
|---|---|---|---|---|---|---|
| | | Weight average molecular weight ($\overline{Mw}$) | $Q_{H2}$ | $\alpha_{N_2}^{H_2}$ | $\alpha_{N_2}^{H_2}$ | |
| 32 | poly(1,4-divinylbenzene) | 260000 | $4.2 \times 10^{-4}$ | 37 | 130 | |
| 33 | " | " | $1.9 \times 10^{-4}$ | 43 | 150 | irradiated with ultraviolet rays for 3 hours |
| 34 | " | " | $2.2 \times 10^{-4}$ | 55 | 140 | heated at 90° C. for 24 hours |
| 35 | " | " | $2.8 \times 10^{-4}$ | 53 | 130 | lauryl peroxide used, heated at 90° C. for 24 hours |
| 36 | poly(1,3-divinylbenzene) | 220000 | $4.3 \times 10^{-4}$ | 30 | 120 | |
| 37 | " | " | $2.5 \times 10^{-4}$ | 58 | 160 | heated at 90° C. for 24 hours |
| 38 | copolymer of 1,3-divinylbenzene and 1,4-divinylbenzene | 160000 | $3.9 \times 10^{-4}$ | 38 | 115 | crude divinylbenzene used, heated at 90° C. for 24 hours |
| 39 | blend of poly(1,3-divinylbezene) and poly(1,4-divinylbenzene) | 160000 (1,3-isomer) 160000 (1,4-isomer) | $3.9 \times 10^{-4}$ | 39 | 120 | heated at 90° C. for 24 hours |
| 40 | copolymer of styrene and 1,4-divinylbenzene (tapping polymer) | 200000 | $4.9 \times 10^{-4}$ | 45 | 90 | " |
| 41 | random copolymer of styrene and 1,4-divinylbenzene | 210000 | $4.8 \times 10^{-4}$ | 38 | 100 | " |
| 42 | blend of poly(1,4-divinylbezene) and polystyrene | 260000 (1,4-divinylbenzene) 260000 (polystyrene) | $4.7 \times 10^{-4}$ | 42 | 90 | |
| 43 | blend of poly(1,4-divinylbezene) and polystyrene | 260000 (1,4-divinylbenzene) 260000 (polystyrene) | $3.9 \times 10^{-4}$ | 45 | 100 | heated at 90° C. for 48 hours |
| 44 | copolymer of 1,4-divinylbenzene and acrylonitrile | 220000 | $2.9 \times 10^{-4}$ | 42 | 100 | |
| 45 | copolymer of 1,4-divinylbenzene and methyl acrylate | 200000 | $3.2 \times 10^{-4}$ | 38 | 95 | |
| 46 | copolymer of 1,4-divinylbenzene and ethylhexyl methacrylate | 180000 | $4.5 \times 10^{-4}$ | 33 | 85 | |

EXAMPLE 47

(1) Preparation of Hollow Fiber

P-3500 (trade name of a polysulfone manufactured and sold by Union Carbide Corp., U.S.A.) as a polysulfone type resin and N-methyl-2-pyrrolidone as a solvent

(2) Coating

A monodisperse polystyrene having a weight-average molecular weight of 260,000 (Mw/Mn=1.02) (a fraction obtained by gel permeation chromatography) was dissolved in cyclohexane at 50° C. to form a homogeneous 0.05% by weight solution of polystyrene in cyclohexane. The thus obtained solution was used as a coating solution.

The coating solution was applied to the outer surface of the hollow fiber HF-5 in substantially the same manner as in Example 1, except that the hollow fiber HF-5 and the above-prepared coating solution were used instead of the hollow fiber HF-1 and the coating solution used in Example 1, respectively. Thus, there was obtained a coated hollow fiber. With respect to the above-obtained coated hollow fiber, the permeability for $H_2$ ($Q_{H2}$) and selective permeability constant of $H_2$ over $N_2$ were determined at 25° C. and found to be $3.7 \times 10^{-4}$ cm$^3$(STP)/cm$^2$.sec.cmHg and 37, respectively.

Then, a protective layer was formed on the polystyrene coating of the coated hollow fiber as follows. A polyheptadecafluorodecyl methacrylate was dissolved in trichlorotrifluoroethane to prepare a 0.2% by weight solution of polyheptadecafluorodecyl methacrylate in trichlorotrifluoroethane. One end of the coated hollow fiber was clogged with an adhesive. Then, the coated hollow fiber was evacuated from the open end of the hollow fiber to produce a pressure difference of 600 mmHg between the inside and outside of the hollow fiber, and entirely dipped in the above-prepared solution at 25° C. for 3 minutes to form a protective layer on the polystyrene coating. Thus, there was obtained a composite membrane. The aboveobtained composite membrane was subjected to determination of permeability for $H_2$ ($Q_{H2}$) and selective permeability constant of $H_2$ over $N_2$ at 25° C. The results are shown in Table 7.

Thereafter, a nitrogen gas stream of 100° C. was passed through the composite membrane for 24 hours. Subsequently, the permeability for $H_2$ ($Q_{H2}$) and selective permeability constant of $H_2$ over $N_2$ were determined at 25° C. The results are shown in Table 7.

EXAMPLE 48

The same procedures as in Example 47 were repeated to prepare a coated hollow fiber comprised of the hollow fiber HF-5 coated with a monodisperse polystyrene ($\overline{M}w$, 260,000: $\overline{M}w/\overline{M}n$, 1.02). One end of the coated hollow fiber was clogged with an adhesive. Then, the coated hollow fiber was evacuated from the open end of the hollow fiber to produce a pressure difference of 600 mmHg between the inside and outside of the hollow fiber and entirely dipped in a 0.2% by weight solution of MDX-4-4210 [the trade name of a room temperature vulcanizing silicone (RTV silicone) manufactured and sold by Dow Corning Inc. U.S.A.] in n-hexane. After 3 minutes, the coated hollow fiber was taken out of the solution and was allowed to stand at 30° C. for 24 hours. Thus, there was obtained a composite membrane. The above-obtained composite membrane was subjected to determination of permeability for $H_2$ ($Q_{H2}$) and selective permeability constant of $H_2$ over $N_2$, at 25° C. The results are shown in Table 7.

Thereafter, a nitrogen gas stream of 100° C. was passed through the composite membrane for 24 hours. Subsequently, the permeability for $H_2$ ($Q_{H2}$) and selective permeability constant of $H_2$ over $N_2$ were determined at 25° C. The results are shown in Table 7.

TABLE 7

| Example No. | Hollow fiber (suppositing material) | | | | | Polystyrene coating | | |
|---|---|---|---|---|---|---|---|---|
| | Conditions for preparation | | Inner diameter (mm) | Outer diameter (mm) | Rejection of Dextran T-70 ($\overline{M}w$: 70,000) (%) | Weight average molecular weight of polystyrene ($\overline{M}w$) | Concentration of polystyrene in coating solution | Coating conditions |
| | Polymer | Solvent | | | | | | |
| 47 | Polysulfone 25 wt % | N—methyl-2-pyrrolidone 75 wt % | 0.1 | 0.3 | 95 | 260,000 | 0.05 wt % in cyclohexane | dipping for 3 min; pressure difference, 600 mmHg |
| 48 | Polysulfone 25 wt % | N—methyl-2-pyrrolidone 75 wt % | " | " | " | " | 0.05 wt % in cyclohexane | dipping for 3 min; pressure difference, 600 mmHg |

| Example No. | Protective layer | | Characteristics of the resulting composite membrane | | | |
|---|---|---|---|---|---|---|
| | Coating material | Concentration of coating material in coating solution | $Q_{H2}$ | | $\alpha_{N_2}^{H_2}$ | |
| | | | Before heat treatment | After heat treatment | Before heat treatment | After heat treatment |
| 47 | polyheptadecafluorodecyl methacrylate | 0.2 wt % in trichlorotrifluoroethane | $3.0 \times 10^{-4}$ | $3.0 \times 10^{-4}$ | 32 | 32 |
| 48 | RTV silicone | 0.2 wt % in n-hexane | " | " | 30 | 30 |

EXAMPLE 49

11 (eleven) kinds of monodisperse polystyrenes (fractions obtained by GPC) as indicated in Table 8 were separately dissolved in cyclohexane to prepare 0.06% by weight coating solutions of polystyrene in cyclohexane.

TABLE 8

| | Coating polymer | | |
|---|---|---|---|
| Sample | Kind | $\overline{M}w$ *1 | $\overline{M}w/\overline{M}n$ *2 |
| 1 | Polystyrene | $9.50 \times 10^2$ | 1.13 |

TABLE 8-continued

| Sample | Coating polymer Kind | $\overline{M}w$ *1 | $\overline{M}w/\overline{M}n$ *2 |
|---|---|---|---|
| 2 | " | $6.20 \times 10^3$ | 1.04 |
| 3 | " | $1.67 \times 10^4$ | 1.01 |
| 4 | " | $4.28 \times 10^4$ | 1.01 |
| 5 | " | $1.07 \times 10^5$ | 1.01 |
| 6 | " | $1.86 \times 10^5$ | 1.07 |
| 7 | " | $3.55 \times 10^5$ | 1.01 |
| 8 | " | $7.75 \times 10^5$ | 1.04 |
| 9 | " | $1.95 \times 10^6$ | 1.04 |
| 10 | " | $2.89 \times 10^6$ | 1.09 |
| 11 | " | $8.42 \times 10^6$ | 1.17 |

Note:
*1 $\overline{M}w$: weight average molecular weight
*2 $\overline{M}w/\overline{M}n$: weight average molecular weight divided by number average molecular weight The above-prepared coating solutions were coated on the same hollow fiber HF-5 as prepared in Example 47 in substantially the same manner as in Example 1, except that HF-5 was used instead of HF-1 and that the above-prepared coating solutions were used instead of that used in Example 1. Thus, there were obtained composite membranes.

The composite membranes were subjected to determination of permeability for $H_2$ ($Q_{H2}$) and selective permeability constant of $H_2$ over $N_2$. The relationships between the weight average molecular weight of polystyrene and $Q_{H2}$ and between the weight average molecular weight of polystyrene and were obtained from the above data and are shown in FIG. 9 and FIG. 10, respectively.

The thickness and amount of the polystyrene type resin coating formed on the polysulfone type resin porous membrane of the composite membrane obtained in Examples 1 to 48 and Comparative Examples 1 to 3 as described hereinbefore will be summarized in Table 9.

TABLE 9

| Example No. | Thickness of coating of polystyrene type resin [μm] | Amount of polystyrene type resin coated on the polysulfone type resin porous membrane [g/cm²] |
|---|---|---|
| Comp. Ex. 1 | <0.4 | $8 \times 10^{-4}$ |
| Comp. Ex. 2 | " | $5 \times 10^{-4}$ |
| Ex. 1 | 0.4 | $2 \times 10^{-5}$ |
| Ex. 2 | " | $2 \times 10^{-5}$ |
| Ex. 3 | " | $1 \times 10^{-5}$ |
| Ex. 4 | 0.6 | $6 \times 10^{-5}$ |
| Comp. Ex. 3 | <0.4 | $1.5 \times 10^{-4}$ |
| Ex. 5 | 0.5 | $3 \times 10^{-5}$ |
| Ex. 6 | 0.4 | $6 \times 10^{-5}$ |
| Ex. 7 | 0.4 | $2.5 \times 10^{-4}$ |
| Ex. 8 | " | $1.0 \times 10^{-4}$ |
| Ex. 9 | " | $6.0 \times 10^{-5}$ |
| Ex. 10 | " | $2.5 \times 10^{-5}$ |
| Ex. 11 | " | $7.5 \times 10^{-6}$ |
| Ex. 12 | " | $3.0 \times 10^{-6}$ |
| Ex. 13 | " | $1.5 \times 10^{-6}$ |
| Ex. 14 | " | $6.5 \times 10^{-7}$ |
| Ex. 15 | " | $4.0 \times 10^{-7}$ |
| Ex. 16 | " | $3.0 \times 10^{-7}$ |
| Ex. 17 | " | $2.5 \times 10^{-7}$ |
| Ex. 18 | " | " |
| Ex. 19 | " | $2.0 \times 10^{-7}$ |
| Ex. 20 | " | " |
| Comp. Ex. 4 | " | $<10^{-8}$ |
| Ex. 21 | " | $8 \times 10^{-7}$ |
| Ex. 22 | " | $6 \times 10^{-7}$ |
| Ex. 23 | " | $6 \times 10^{-7}$ |
| Ex. 24 | " | $7 \times 10^{-7}$ |
| Ex. 25 | " | $5 \times 10^{-7}$ |
| Ex. 26 | " | $1 \times 10^{-7}$ |
| Ex. 27 | " | $2 \times 10^{-7}$ |
| Ex. 28 | 0.4 | $2 \times 10^{-5}$ |
| Ex. 29 | <0.4 | $4 \times 10^{-7}$ |
| Ex. 30 | " | $5 \times 10^{-7}$ |
| Ex. 31 | " | $5 \times 10^{-7}$ |
| Ex. 32 | " | $3 \times 10^{-6}$ |
| Ex. 33 | " | $3 \times 10^{-6}$ |
| Ex. 34 | " | $4 \times 10^{-6}$ |
| Ex. 35 | " | " |
| Ex. 36 | " | " |
| Ex. 37 | " | " |
| Ex. 38 | " | $5 \times 10^{-6}$ |
| Ex. 39 | " | $2 \times 10^{-6}$ |
| Ex. 40 | " | $2 \times 10^{-6}$ |
| Ex. 41 | " | $7 \times 10^{-7}$ |
| Ex. 42 | " | $6 \times 10^{-7}$ |
| Ex. 43 | " | " |
| Ex. 44 | " | " |
| Ex. 45 | " | " |
| Ex. 46 | " | $7 \times 10^{-7}$ |
| Ex. 47 | " | $2 \times 10^{-6}$ |
| Ex. 48 | " | " |

EXAMPLE 50

The gas permeabilities for $N_2$ and $O_2$ of the composite membrane obtained in Example 2 were as follows:
$Q_{N2} = 0.94 \times 10^{-5}$ cm³(STP)//cm².sec.cmHg],
$Q_{O2} = 5.6 \times 10^{-5}$ [cm³(STP)//cm².sec.cmHg].

Incidentally, the selective permeability constant of $O_2$ over $N_2$ of the coating material (polystyrene having a weight average molecular weight of $50 \times 10^4$) of the composite membrane was 6.3.

What is claimed is:
1. A composite membrane for use in the separation of a gas from a mixture of gases which comprises:
   a polysulfone type resin porous membrane capable of rejecting 90% or more of dextran molecules having a weight average molecular weight of 70,000; and
   a styrene type resin coated on at least one surface of said polysulfone type resin porous membrane, said styrene type resin being a member selected from the group consisting of:
   (I) a linear polymer having a weight average molecular weight of $1 \times 10^5$ or more comprising 0 to 100 mol % of a structural unit (a), 0 to 100 mol % of structural unit (b) and 0 to 30 mol % of a structural unit (c), provided that the total amount of said structural units (a), (b) and (c) is 100 mol %,
   said structural unit (a) being represented by the formula

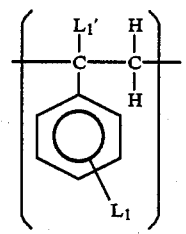

[I]

wherein $L_1$ is selected from the group consisting of a hydrogen atom, a halogen atom and a straight or branched, hydrocarbon radical having 1 to 10 carbon atoms, and $L_1'$ is selected from the group consisting of hydrogen atom, a halogen atom, and a straight or branched hydrocarbon radical having 1 to 6 carbon atoms, said structural unit (b) being represented by the formula

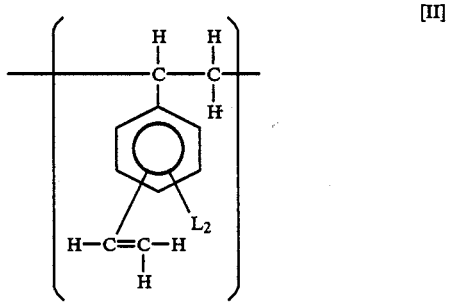
[II]

wherein $L_2$ is selected from the group consisting of a hydrogen atom, halogen atom and a straight or branched hydrocarbon radical having 1 to 8 carbon atoms, said structural unit (c) being represented by the formula

[III]

wherein X is selected from the group consisting of a hydrogen atom, halogen atom, a methyl group and a cyano group, and Y is selected from the group consisting of (i)

wherein $L_3$ is selected from the group consisting of a straight or branched hydrocarbon radical having 1 to 20 carbon atoms, (ii) a cyano group, (iii) a nitro group, (iv) a pyridyl group, (v)

wherein $L_4$ is selected from the group consisting of a straight or branched hydrocarbon radical having 1 to 12 carbon atoms and (vi)

wherein $L_5$ and $L_6$ each independently are selected from the group consisting of a hydrogen atom, a straight or branched hydrocarbon radical having 1 to 12 carbon atoms, a phenyl group and a cyclohexyl group, (II) a blend polymer prepared by blending at least two different linear polymers (I) each as defined above, and (III) a crosslinked polymer selected from the group consisting of:

(i) a crosslinked polymer prepared by crosslinking a linear polymer having a weight average molecular weight of $1 \times 10^3$ or more comprising 0 to 100 mol % of a structural unit (a) as defined above, 0 to 100 mol % of a structural unit (b) as defined above and 0 to 30 mol % of a structural unit (c) as defined above, provided that the total amount of said structural units (a), (b) and (c) is 100 mol %, and (ii) a crosslinked polymer prepared by crosslinking a blend polymer prepared by blending at least two different linear polymers each having a weight average moelcular weight of $1 \times 10^3$ or more, said linear polymers each comprising 0 to 100 mol % of a structural unit (a) as defined above, 0 to 100 mol % of a structural unit (b) as defined above and 0 to 30 mol % of a structural unit (c) as defined above, provided that the total amount of said structural units (a), (b) and (c) is 100 mol %, said styrene type resin having a selective gas permeability of not smaller than that of said polysulfone type resin porous membrane, said styrene type resin being coated on said polysulfone type resin porous membrane in a thickness of 5 $\mu$m or less and in an mount of at least $1.0 \times 10^{-7}$ g/cm$^2$ of said polysulfone type resin porous membrane.

2. A composite membrane according to claim 1, wherein said styrene type resin being a member selected from the group consisting of:

(I') a linear polymer having a weight average molecular weight of $1 \times 10^5$ or more comprising 0 to 100 mol % of a structural unit (a) as defined above, 0 to 100 mol % of a structural unit (b) as defined above and 0 to 10 mol % of a structural unit (c) as defined above, provided that the total amount of said structural units (a), (b) and (c) is 100 mol %, (II') a blend polymer prepared by blending at least two different linear polymers (I) each as defined above, and (III') a crosslinked polymer selected from the group consisting of:

(i') a crosslinked polymer prepared by crosslinking a linear polymer having a weight average molecular weight of $1 \times 10^3$ or more comprising 0 to 100 mol % of a structural unit (a) as defined above, 0 to 100 mol % of a structural unit (b) as defined above and 0 to 10 mol % of a structural unit (c) as defined above, provided that the total amount of said structural units (a), (b) and (c) is 100 mol %, and (ii') a crosslinked polymer prepared by crosslinking a blend polymer prepared by blending at least two different linear polymers each having a weight average molecular weight of $1 \times 10^3$ or more, said linear polymers each comprising 0 to 100 mol % of a structural unit (a) as defined above, 0 to 100 mol % of a structural unit (b) as defined above and 0 to 10 mol % of a structural unit (c) as defined above, provided that the total amount of said structural units (a), (b) and (c) is 100 mol %.

3. A composite membrane according to claim 1, wherein said polysulfone type resin porous membrane is a hollow fiber.

4. A composite membrane according to claim 1, wherein said styrene type resin is coated on said polysulfone type resin porous membrane in a thickness of 4 μm or less.

5. A composite membrane according to claim 1 which further comprises a protective layer coated on at least one surface of said composite membrane.

* * * * *